(12) United States Patent
Kumar et al.

(10) Patent No.: US 9,633,163 B1
(45) Date of Patent: Apr. 25, 2017

(54) SYSTEM AND METHOD FOR DISPLAYING ROUTING OPTIONS IN AN ELECTRONIC DESIGN

(71) Applicant: Cadence Design Systems, Inc., San Jose, CA (US)

(72) Inventors: Hitesh Mohan Kumar, Utter Pradesh (IN); Sagar Kumar, Uttar Pradesh (IN); Ankur Gupta, Haryana (IN)

(73) Assignee: Cadence Design Systems, Inc., San Jose, CA (US)

( * ) Notice: Subject to any disclaimer, the term of this patent is extended or adjusted under 35 U.S.C. 154(b) by 29 days.

(21) Appl. No.: 14/589,537

(22) Filed: Jan. 5, 2015

(51) Int. Cl.
| | |
|---|---|
| *G06F 17/50* | (2006.01) |
| *H01L 23/498* | (2006.01) |
| *H01L 27/02* | (2006.01) |
| *H01L 21/66* | (2006.01) |
| *G06F 9/44* | (2006.01) |
| *G06F 17/30* | (2006.01) |

(52) U.S. Cl.
CPC ...... *G06F 17/5077* (2013.01); *G06F 17/5081* (2013.01); *G06F 8/71* (2013.01); *G06F 17/30867* (2013.01); *G06F 17/509* (2013.01); *G06F 17/5045* (2013.01); *G06F 2217/06* (2013.01); *H01L 22/34* (2013.01); *H01L 23/49838* (2013.01); *H01L 27/0207* (2013.01)

(58) Field of Classification Search
CPC ........... G06F 17/30867; G06F 17/5081; G06F 17/5045; G06F 17/509; G06F 2217/06; G06F 8/71; H01L 27/0207; H01L 22/34
See application file for complete search history.

(56) References Cited

U.S. PATENT DOCUMENTS

| | | | | |
|---|---|---|---|---|
| 5,550,748 A | * | 8/1996 | Xiong | G06F 17/5077 716/129 |
| 5,787,268 A | * | 7/1998 | Sugiyama | G06F 17/5022 714/735 |
| 5,896,301 A | * | 4/1999 | Barrientos | G06F 17/5072 716/113 |
| 6,117,183 A | * | 9/2000 | Teranishi | G06F 17/5031 716/113 |
| 6,240,541 B1 | * | 5/2001 | Yasuda | G06F 17/5022 716/112 |
| 6,405,358 B1 | * | 6/2002 | Nuber | G06F 17/5072 716/111 |
| 6,678,874 B1 | * | 1/2004 | Jochym | G06F 17/5077 716/112 |
| 7,017,138 B2 | * | 3/2006 | Zirojevic | H04L 45/00 324/750.01 |
| 7,194,706 B2 | * | 3/2007 | Adkisson | G01R 31/31855 716/112 |
| 7,293,058 B2 | * | 11/2007 | Thurman | G06F 8/71 370/357 |
| 7,398,497 B2 | * | 7/2008 | Sato | G06F 17/5045 716/112 |

(Continued)

*Primary Examiner* — Helen Rossoshek
(74) *Attorney, Agent, or Firm* — Mark H. Whittenberger, Esq.; Holland & Knight LLP

(57) ABSTRACT

The present disclosure relates to a computer-implemented method for electronic design automation. The method may include providing, using one or more processors, an electronic design and visually displaying a plurality of possible route sets associated with the electronic design at a graphical user interface. The method may include providing an option to select between the plurality of possible route sets at the graphical user interface.

11 Claims, 28 Drawing Sheets

(56) References Cited

U.S. PATENT DOCUMENTS

| | | | | |
|---|---|---|---|---|
| 7,516,434 B2* | 4/2009 | Okabe | G06F 17/5072 | 716/103 |
| 7,536,665 B1* | 5/2009 | Horlick | G06F 17/5077 | 716/126 |
| 7,793,249 B1* | 9/2010 | Wadland | G06F 17/5077 | 716/129 |
| 8,191,032 B1* | 5/2012 | Wadland | G06F 17/5072 | 716/126 |
| 8,402,424 B2* | 3/2013 | Katagiri | G06F 17/5077 | 716/119 |
| 8,601,422 B2* | 12/2013 | Tripathi | G06F 17/5077 | 716/100 |
| 8,683,422 B2* | 3/2014 | Nojima | G06F 17/5068 | 716/136 |
| 8,788,999 B1* | 7/2014 | Baldsdon | G06F 17/5077 | 716/126 |
| 8,806,405 B2* | 8/2014 | Colwell | G06F 17/5077 | 716/101 |
| 8,839,184 B1* | 9/2014 | Seguine | G06F 17/5054 | 716/110 |
| 8,904,332 B1* | 12/2014 | Neal | | 716/113 |
| 2003/0005155 A1* | 1/2003 | Carbonell | G06F 8/71 | 709/239 |
| 2003/0028852 A1* | 2/2003 | Thurman | G06F 8/71 | 716/126 |
| 2006/0247902 A1* | 11/2006 | Rourke | G06F 17/5004 | 703/1 |
| 2010/0199251 A1* | 8/2010 | Potts | G06F 17/5077 | 716/124 |
| 2012/0192135 A1* | 7/2012 | Gullette | G06F 17/5081 | 716/113 |
| 2013/0298100 A1* | 11/2013 | Hastings | G06F 17/50 | 716/126 |
| 2016/0110490 A1* | 4/2016 | Ding | G06F 17/5077 | 716/126 |

* cited by examiner

| AUTO-ROUTE STRATEGY | RUN | ROUTE CONSTRAINTS |
|---|---|---|
| Z ROUTER - 3 | ☑ | MIN STUB LENGTH = 3, MAX BENDS = 2 |
| Z ROUTER - 2 | ☑ | MIN STUB LENGTH = 2, MAX BENDS = 2 |
| Z ROUTER - 1 | ☑ | MIN STUB LENGTH = 1, MAX BENDS = 2 |
| L ROUTER | ☑ | DEFAULT |
| A-STAR ROUTER | ☐ | MIN STUB LENGTH = 3 |

FIG. 16

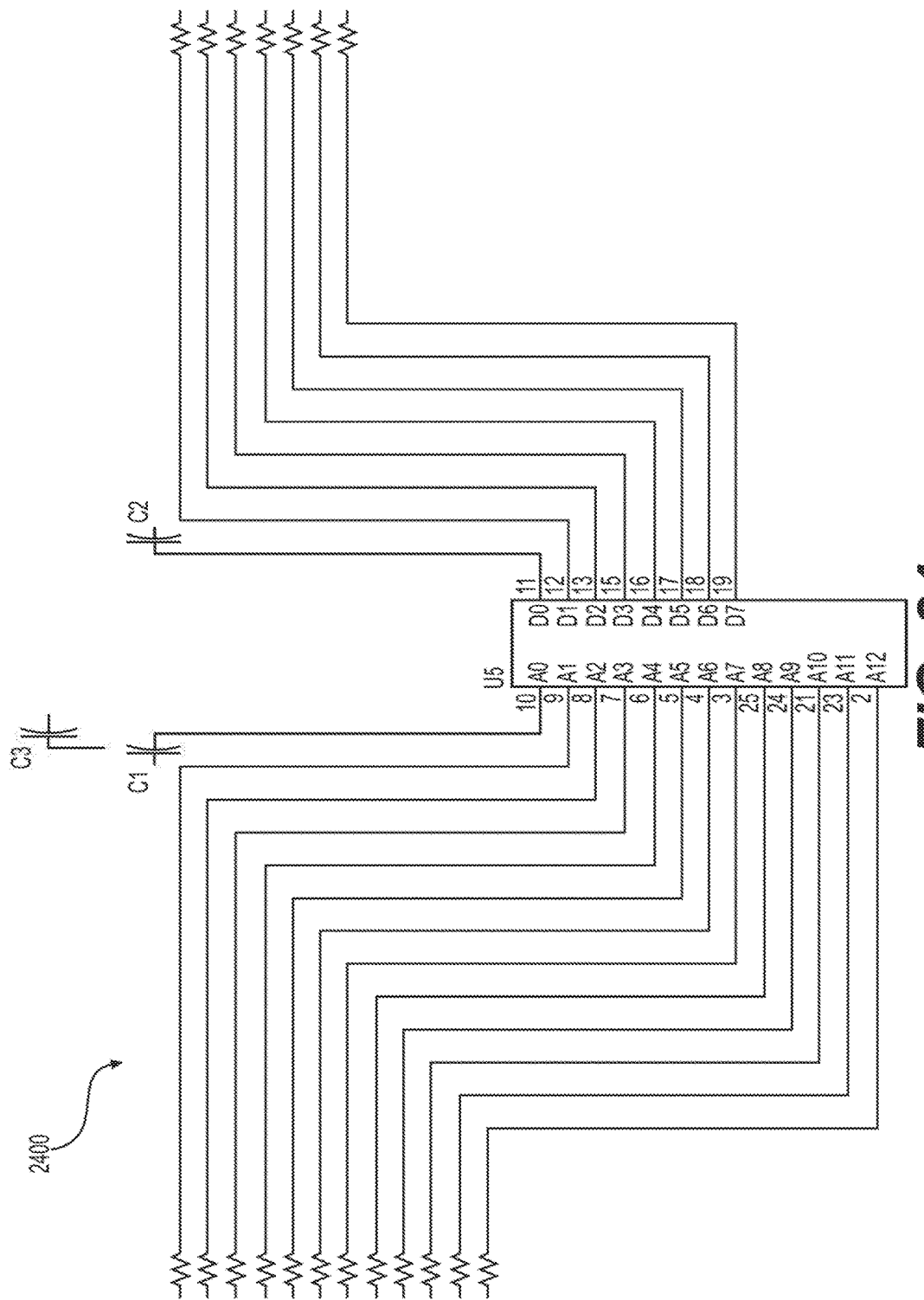

SYSTEM AND METHOD FOR DISPLAYING ROUTING OPTIONS IN AN ELECTRONIC DESIGN

FIELD OF THE INVENTION

The present disclosure relates to electronic design automation, and more specifically, to a graphical method for visualizing and presenting routing options in an electronic design.

DISCUSSION OF THE RELATED ART

Electronic design automation (EDA) utilizes software tools that may be used in the design and analysis of numerous electronic systems such as printed circuit boards (PCBs) and integrated circuits (ICs). Verification environments include constraints that describe the relationship between the variables that control the simulation (and sometimes the data that is used as well). For example, in order to verify certain IC designs many simulations are run, which may verify different aspects of the design being tested. Each test may run for a certain amount of design time (usually measured in clock cycles) and a certain amount of user time.

Auto-routing in a schematic involves finding route paths between sets of connection point pairs by using a routing strategy. Auto-routing can be performed between static connection points (e.g., a route between the pins of two already placed components), or between static and dynamic connection points (e.g., dynamic route creation with the component pin when the component is being moved on the schematic canvas), to provide an early feedback to the designer during the movement process.

In both the static and the dynamic cases of auto-routing, often the schematic designer is constrained to use the one automatic route path that is presented. Often, the system calculated route path does not meet the design aesthetics or is not optimized as per the designer's expectations and this forces the designer to accept this as it is the only route path presented. The designer must then painstakingly readjust the paths manually to perform the corrections as a post process.

SUMMARY

In one or more embodiments of the present disclosure, a computer-implemented method is provided. The method may include providing, using one or more processors, an electronic design and visually displaying a plurality of possible route sets associated with the electronic design at a graphical user interface. The method may include providing an option to select between the plurality of possible route sets at the graphical user interface.

One or more of the following features may be included. In some embodiments, the method may include generating real-time feedback for each of the plurality of possible route sets at the graphical user interface. The method may further include providing an option to configure a plurality of auto-routing strategies to generate at least one alternate set of route paths for a circuit instance. In some embodiments, visually displaying may be associated with at least one of static auto-routing and dynamic auto-routing. In some embodiments, the plurality of possible route sets may be based upon, at least one of, a same set of constraints and one or more different sets of constraints. The method may include determining if a particular routing strategy will fail. If it is determined that the particular routing strategy will fail, the method may include providing one or more alternative routing strategies.

In some embodiments, a computer-readable storage medium having stored thereon instructions that when executed by a machine result in one or more operations is provided. Operations may include providing, using one or more processors, an electronic design and visually displaying a plurality of possible route sets associated with the electronic design at a graphical user interface. Operations may include providing an option to select between the plurality of possible route sets at the graphical user interface.

One or more of the following features may be included. In some embodiments, operations may include generating real-time feedback for each of the plurality of possible route sets at the graphical user interface. Operations may further include providing an option to configure a plurality of auto-routing strategies to generate at least one alternate set of route paths for a circuit instance. In some embodiments, visually displaying may be associated with at least one of static auto-routing and dynamic auto-routing. In some embodiments, the plurality of possible route sets may be based upon, at least one of, a same set of constraints and one or more different sets of constraints. Operations may include determining if a particular routing strategy will fail. If it is determined that the particular routing strategy will fail, the method may include providing one or more alternative routing strategies.

In one or more embodiments of the present disclosure, a system is provided. The system may include one or more processors configured to provide an electronic design and visually display a plurality of possible route sets associated with the electronic design at a graphical user interface. The one or more processors may be further configured to provide an option to select between the plurality of possible route sets at the graphical user interface.

One or more of the following features may be included. In some embodiments, the one or more processors may be further configured to generate real-time feedback for each of the plurality of possible route sets at the graphical user interface. The one or more processors may be further configured to provide an option to configure a plurality of auto-routing strategies to generate at least one alternate set of route paths for a circuit instance. In some embodiments, visually displaying may be associated with at least one of static auto-routing and dynamic auto-routing. The plurality of possible route sets may be based upon, at least one of, a same set of constraints and one or more different sets of constraints. The one or more processors may be further configured to determine if a particular routing strategy will fail.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 16 is a diagram depicting aspects of the display process in accordance with an embodiment of the present disclosure;

FIG. 24 is a diagram depicting aspects of the display process in accordance with an embodiment of the present disclosure.

DETAILED DESCRIPTION

Figure 1:
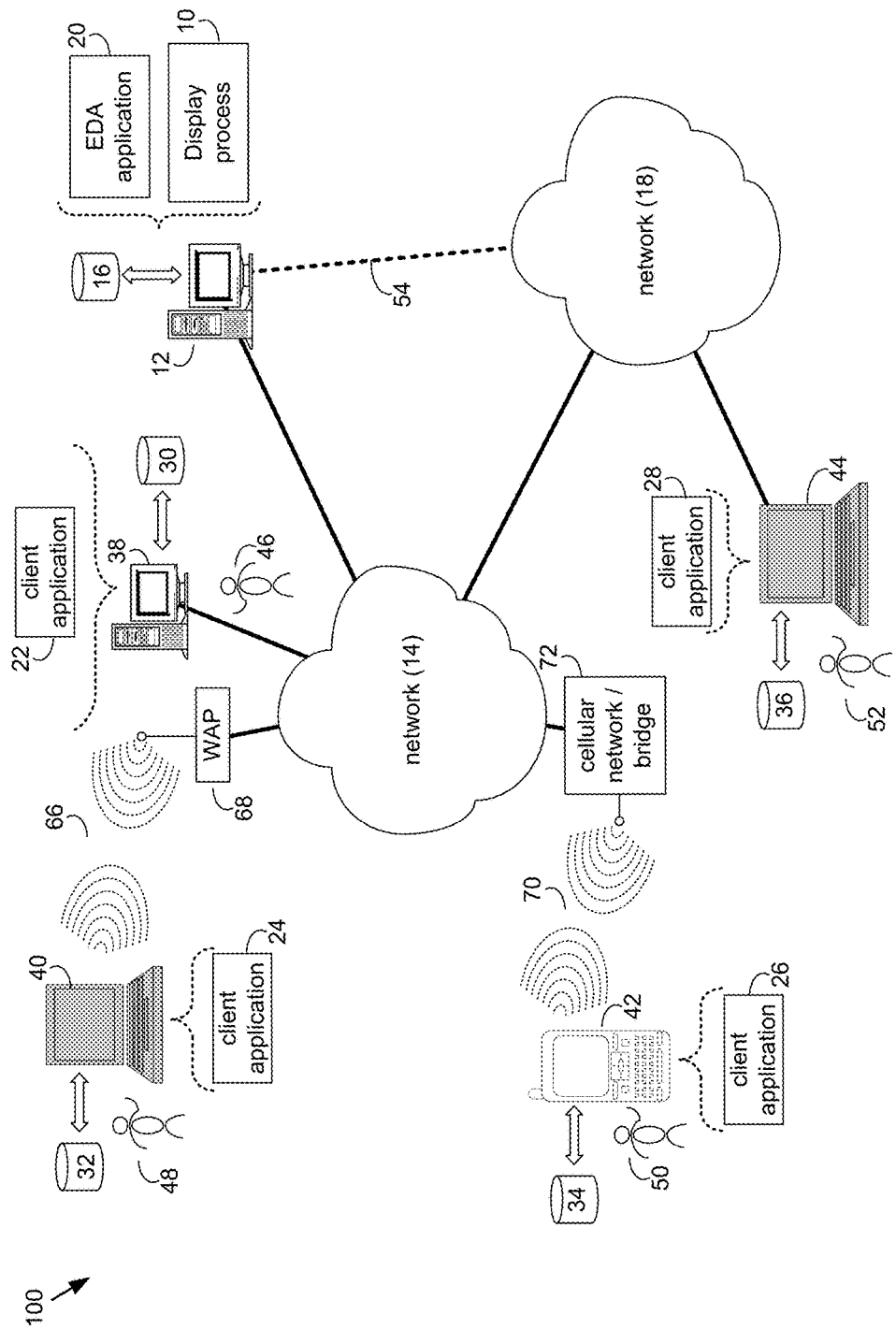
FIG. 1 is a system diagram depicting aspects of the display process in accordance with an embodiment of the present disclosure.

Referring now to FIGS. 1-24, embodiments of the present disclosure relate to a system and method for visualizing and presenting routing options in an electronic design. Accordingly, display process 10, shown in FIG. 1, may allow for the generation and presentation of multiple possible route alternatives that the designer may review in real-time. This real-time feedback may occur at any suitable time during electronic design automation, including, but not limited to, during static and/or dynamic auto-routing associated with schematic design.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown an display process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare® or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the display process may reside on and be executed, in whole or in part, by a client electronic device, such as a personal computer, notebook computer, personal digital assistant, or the like.

The instruction sets and subroutines of display process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Display process 10 may be a stand alone application, or may be an applet/application/script that may interact with and/or be executed within EDA application 20. In addition/as an alternative to being a server-side process, the display process may be a client-side process (not shown) that may reside on a client electronic device (described below) and may interact with an EDA client application (e.g., one or more of EDA client applications 22, 24, 26, 28). Further, the display process may be a hybrid server-side/client-side process that may interact with EDA application 20 and an EDA client application (e.g., one or more of client applications 22, 24, 26, 28). As such, the display process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize display process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
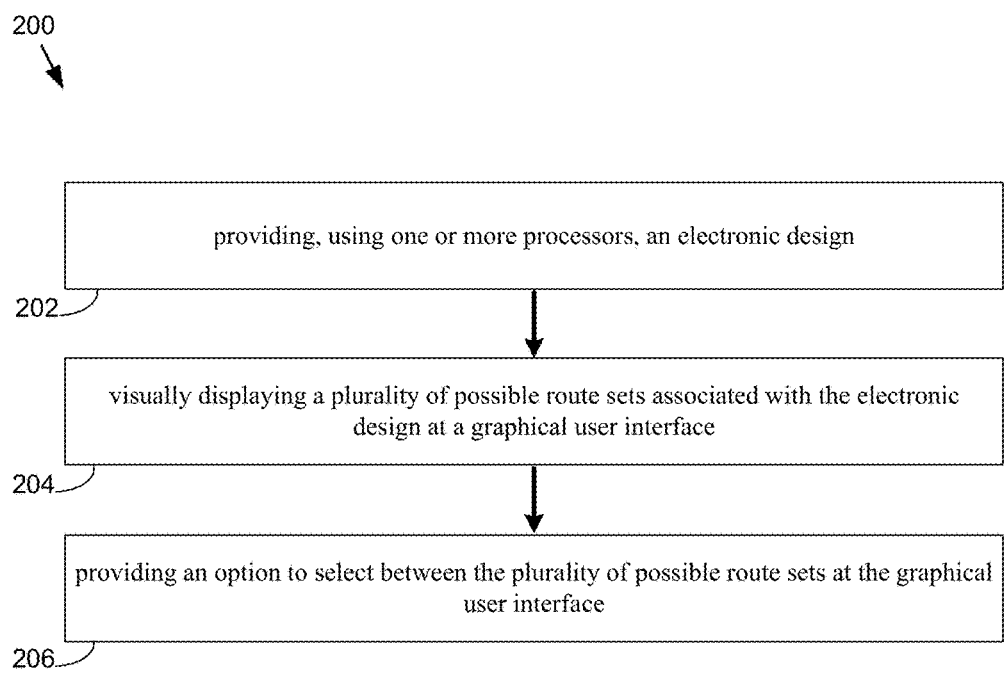
FIG. 2 is a flowchart depicting operations consistent with the display process of the present disclosure.

Referring now to FIG. 2, an embodiment of display process 10 is provided. The process may include providing (202), using one or more processors, an electronic design and visually displaying (204) a plurality of possible route sets associated with the electronic design at a graphical user interface. The method may include providing (206) an option to select between the plurality of possible route sets at the graphical user interface. In some embodiments, this may include providing the option with real-time comparative feedback displayed to the user.

There are a number of issues with some of the existing approaches to auto-routing in an electronic design. For example, the designer is presented only with the single set of paths generated by the auto-router which the auto-router considers to be optimized as per its strategy and constraints. As such, the designer is often forced to accept this system's calculated route paths. Additionally and/or alternatively, alternate sets of auto-paths with multiple route strategies with different routing constraints are not presented to the designer with real-time feedback to decide on the best fit route path as per the design aesthetics. Further, the designer is not easily aware if there other possible route paths using the same routing strategy with different constraints or by using different strategies. Moreover, the designer cannot statically or dynamically configure multiple auto-routing strategies to generate alternate set of route paths for the same circuit instance. There is no interactive selection mechanism presented to the designer to select the best suited set of auto-routes, that can meet his/her design aesthetics in a better way, among all the alternate set of auto-routes calculated using configured routing strategies. There are no ways for displaying comparative feedback and show the real-time route characteristics, such as number of bends, total stub length etc., for all calculated set of route paths that can help the designer to make his selection in the best way. In the case of dynamic auto-routing, the absence of this real-time calculation and feedback is a limitation in existing systems. The probabilty of not finding a valid path using a single routing strategy is high for dense and complex schematics. If the auto-router fails to produce a valid path using one routing strategy, there is no way for the designer to check if the connection would have been possible using some other routing strategy. Moreover, there is no way for the designer to see all the possible routing paths that can be generated by applying different configurations and constraints to a same routing strategy between the same connection points. These issues are applicable both for static as well as dynamic cases of auto-routing. These issues, and others, are addressed by the embodiments of the present disclosure.

Figure 3:
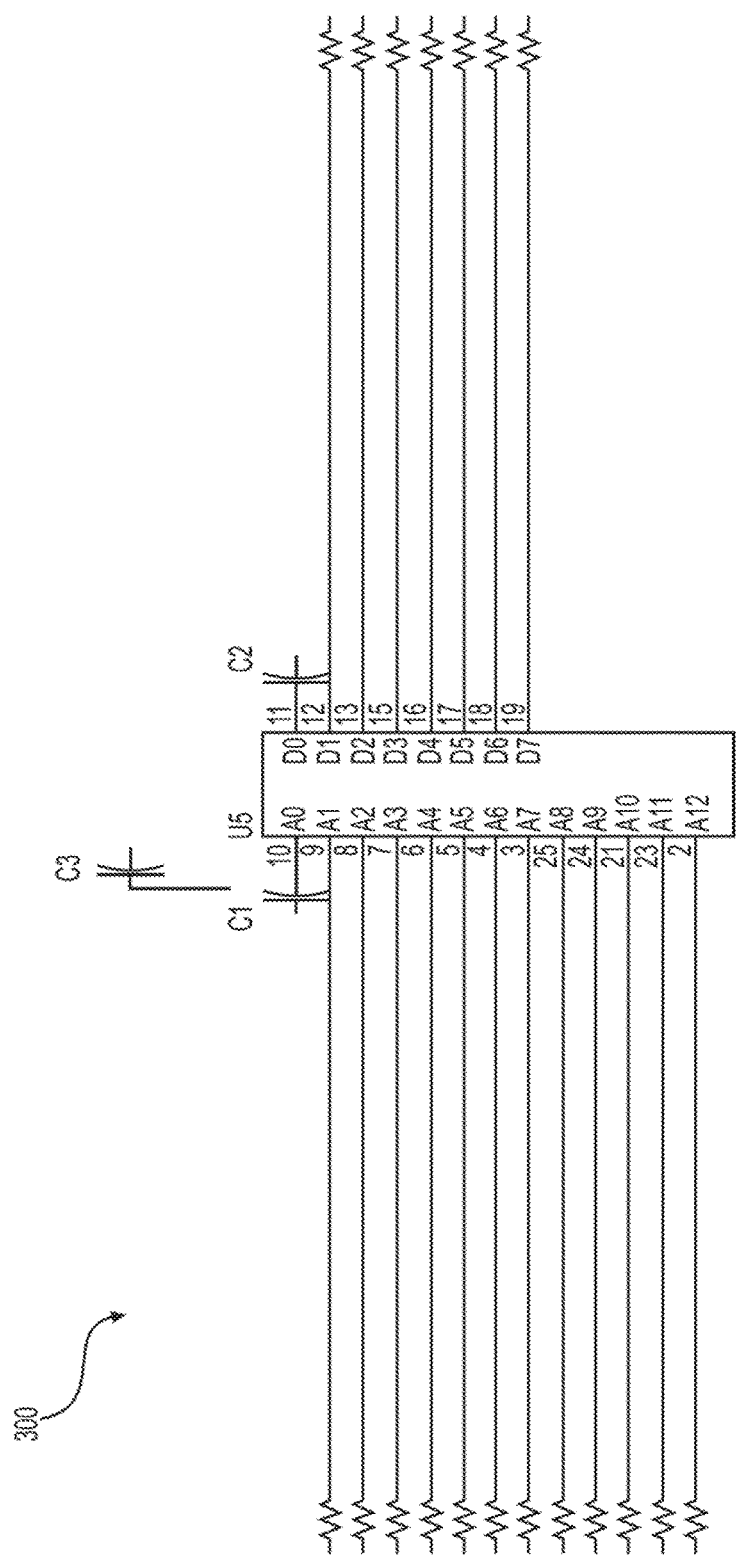
FIG. 3 is a diagram depicting aspects of the display process in accordance with an embodiment of the present disclosure.
Figure 4:
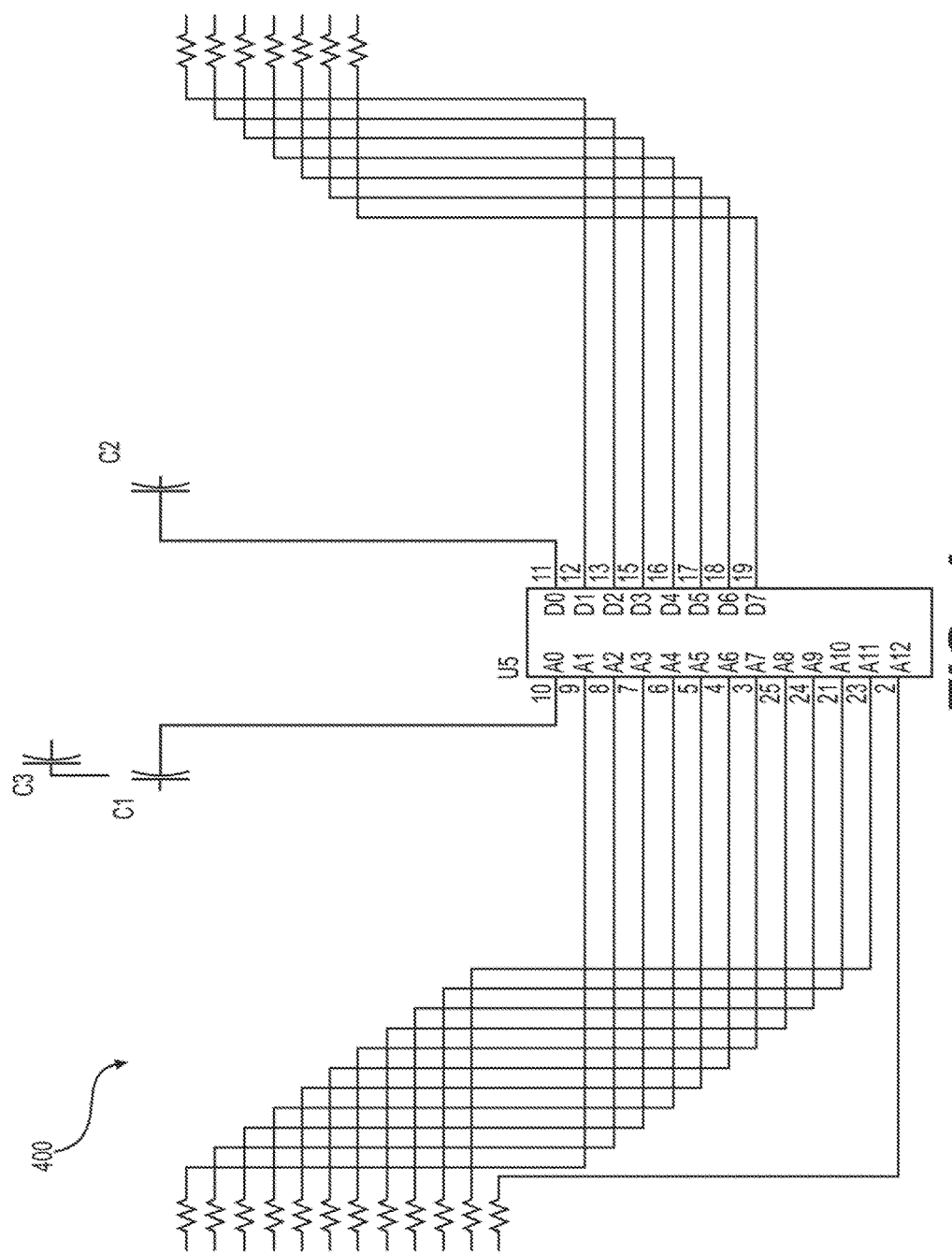
FIG. 4 is a diagram depicting aspects of the display process in accordance with an embodiment of the present disclosure.
Figure 5:
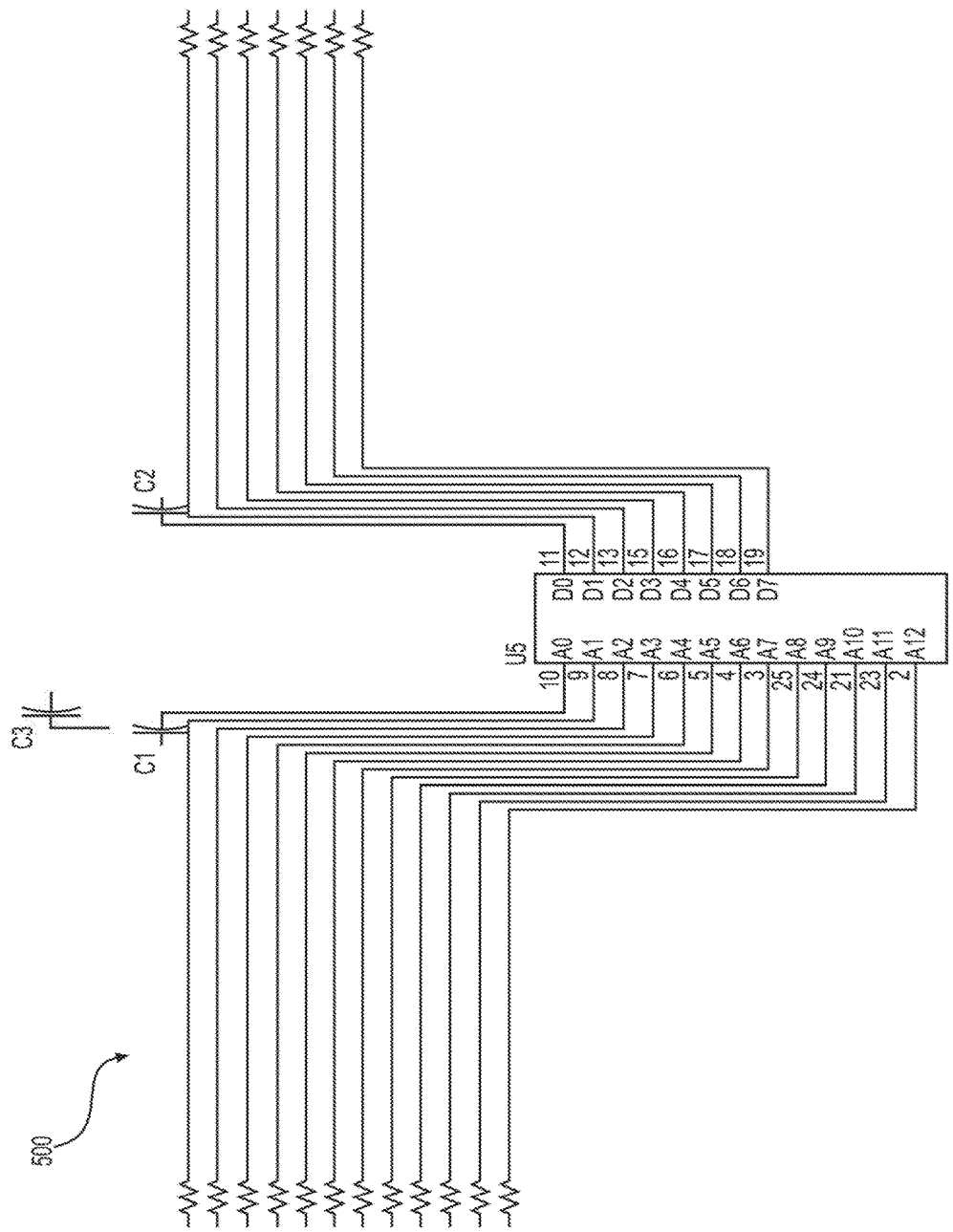
FIG. 5 is a diagram depicting aspects of the display process in accordance with an embodiment of the present disclosure.

Referring also to FIG. 3, a diagram 300 depicting the problems faced by a designer when there is a lack of alternative route paths is provided. In this particular example, a connectivity circuit instance for the component U5 is shown on the schematic. When the component U5 is being moved to a new location, shifted downwards, on the schematic canvas, there are multiple set of routes possible between the moved component's pins with their respective connections, two of them are shown as examples in FIGS. 4-5.

In the front end schematic design tools that exist today, there is no method provided for the schematic designer to view these alternate set of route paths during component movement or between statically placed components. There may be more routing paths available depending on the other configured routing strategies. If the configured auto-routing strategy calculates the route as per FIG. 4 and that is only presented to the designer, the designer is forced to accept the same, even though the routes generated as in FIG. 5 might be the preferred one. Given the choice between the two, the designer would have opted for the route in FIG. 5, but in the absence of any choice, the designers have to accept the routes as in FIG. 4. Then, they have to manually adjust the routes to meet the design aesthetics.

Figure 6:
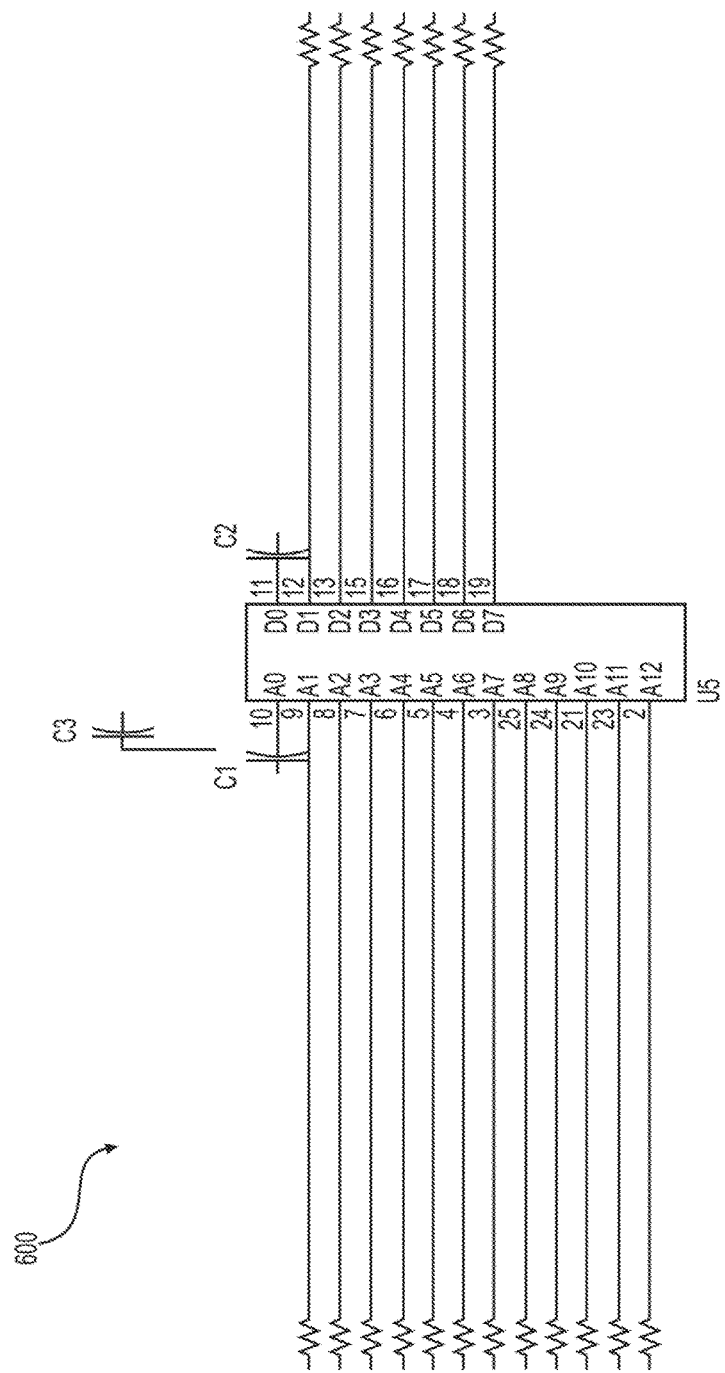
FIG. 6 is a diagram depicting aspects of the display process in accordance with an embodiment of the present disclosure.

Referring now to FIG. 6, a diagram 600 depicting the problems faced by a designer when there is a lack of real-time feedback during routing is provided. In this particular example, a connectivity circuit instance, when component C1 is moved towards left and up is shown.

Figure 7:
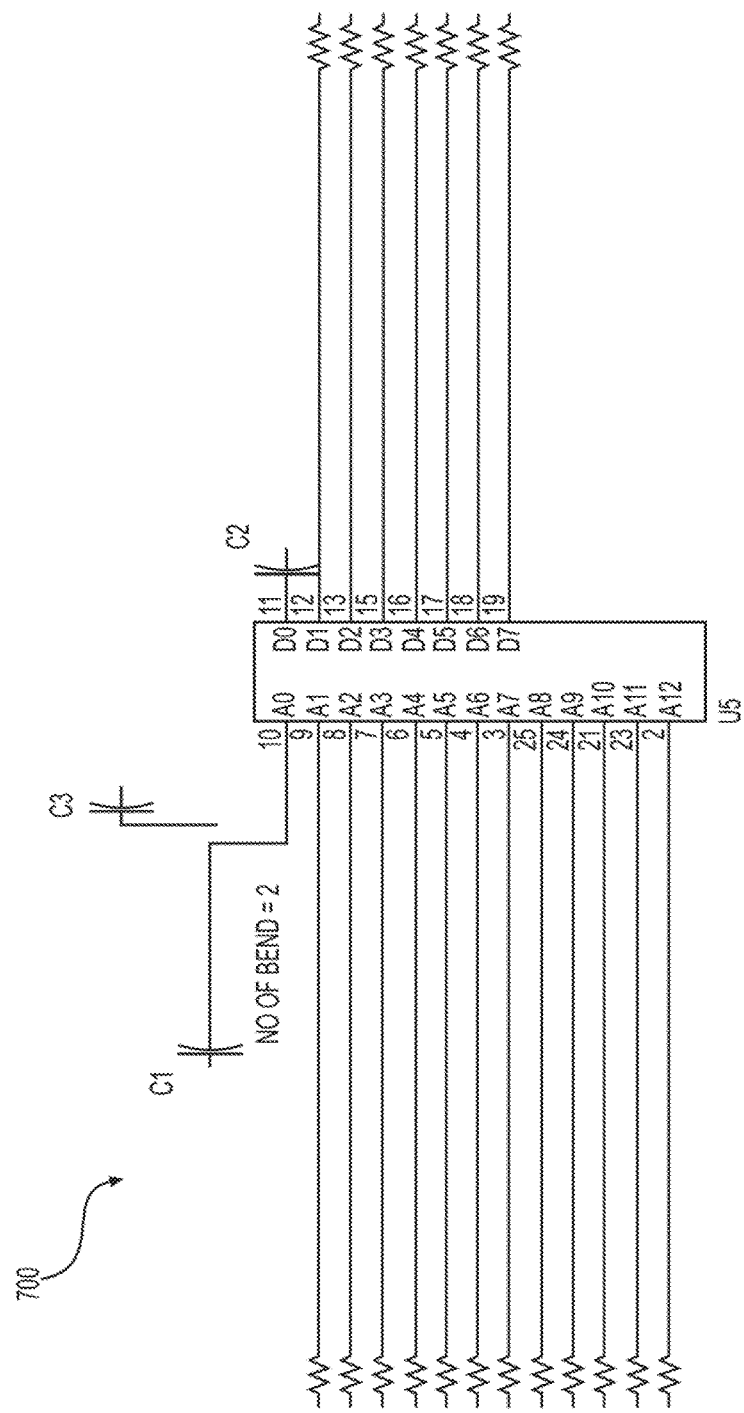
FIG. 7 is a diagram depicting aspects of the display process in accordance with an embodiment of the present disclosure.
Figure 8:
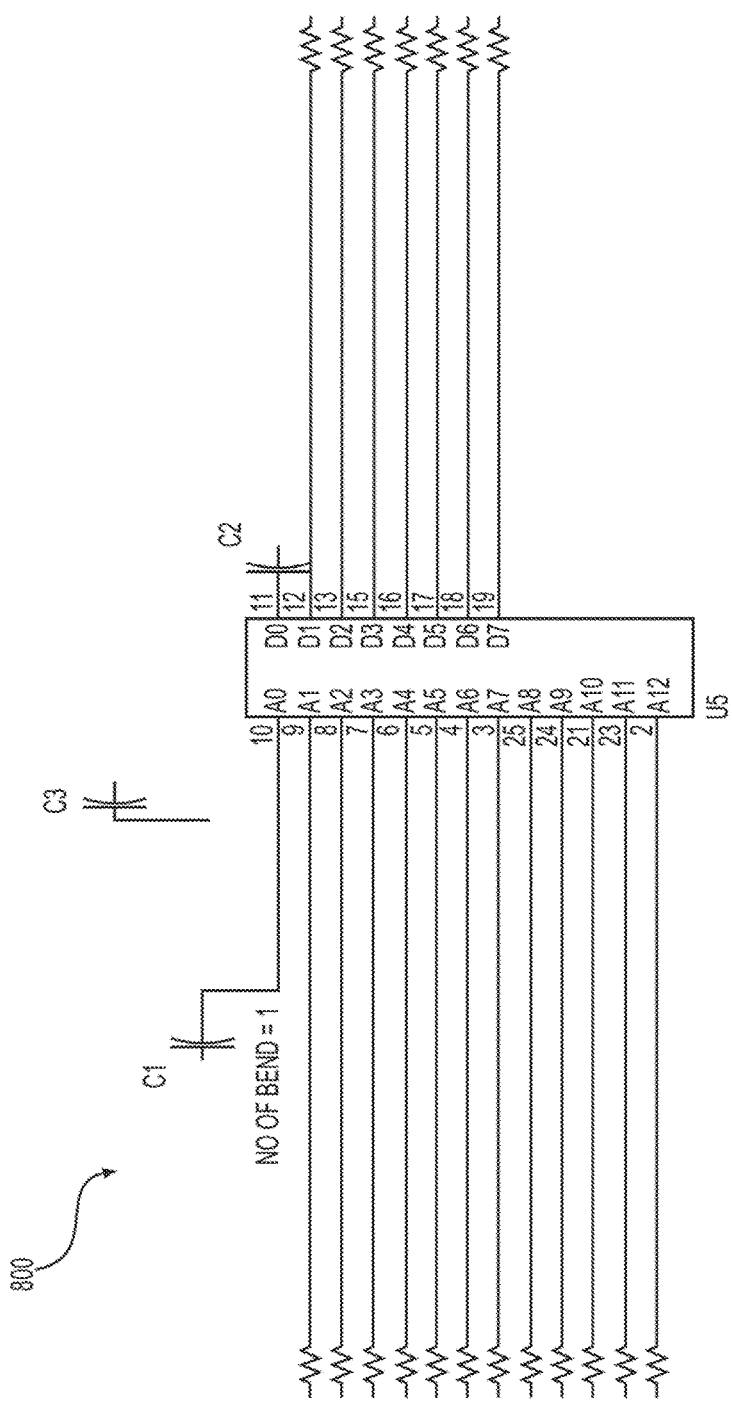
FIG. 8 is a diagram depicting aspects of the display process in accordance with an embodiment of the present disclosure.

In existing systems, front end schematic designers are not provided any comparative real-time feedback that may assist them in deciding the routing path to choose. If comparative feeback, like number of bends, is displayed to the designer as shown in FIGS. 7-8, it would assist them in choosing a routing path.

Figure 9:
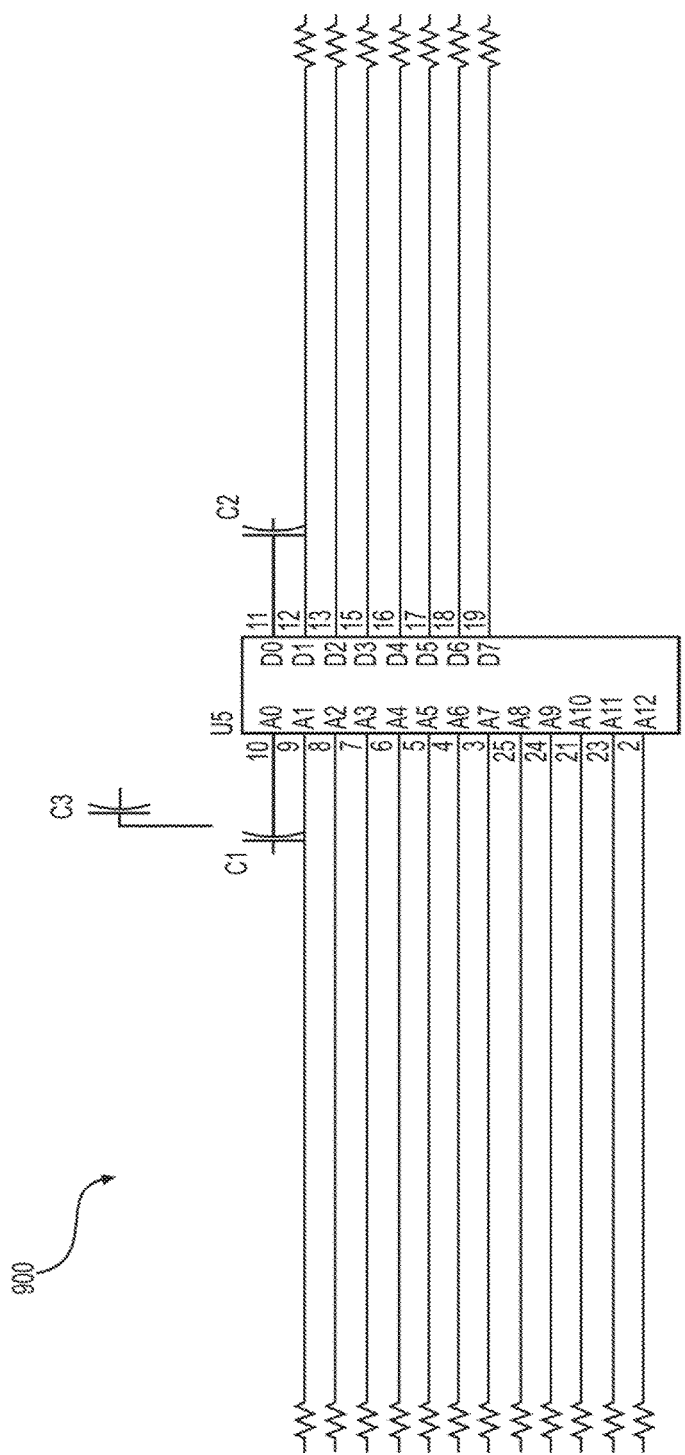
FIG. 9 is a diagram depicting aspects of the display process in accordance with an embodiment of the present disclosure.
Figure 10:
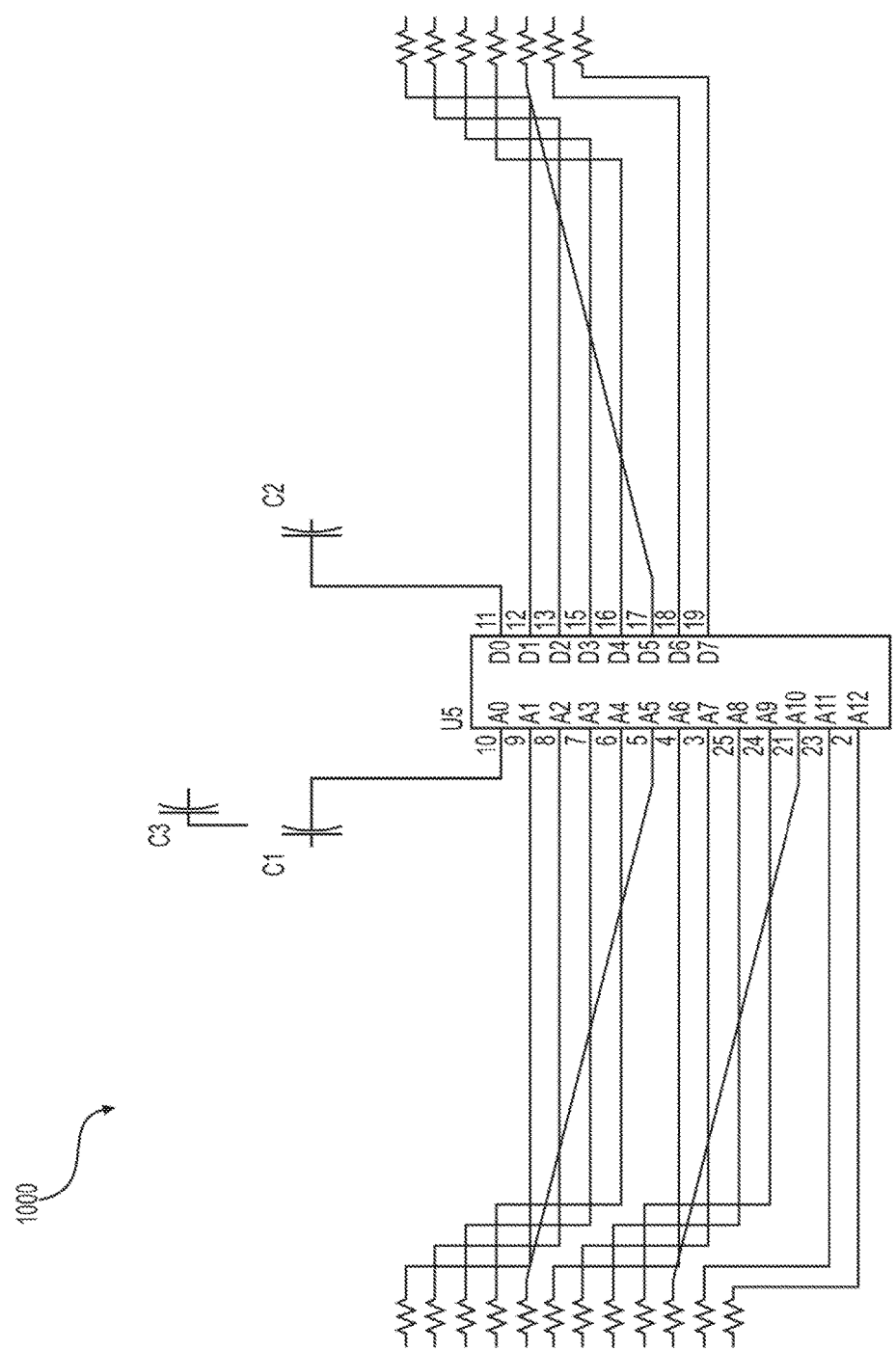
FIG. 10 is a diagram depicting aspects of the display process in accordance with an embodiment of the present disclosure.
Figure 11:
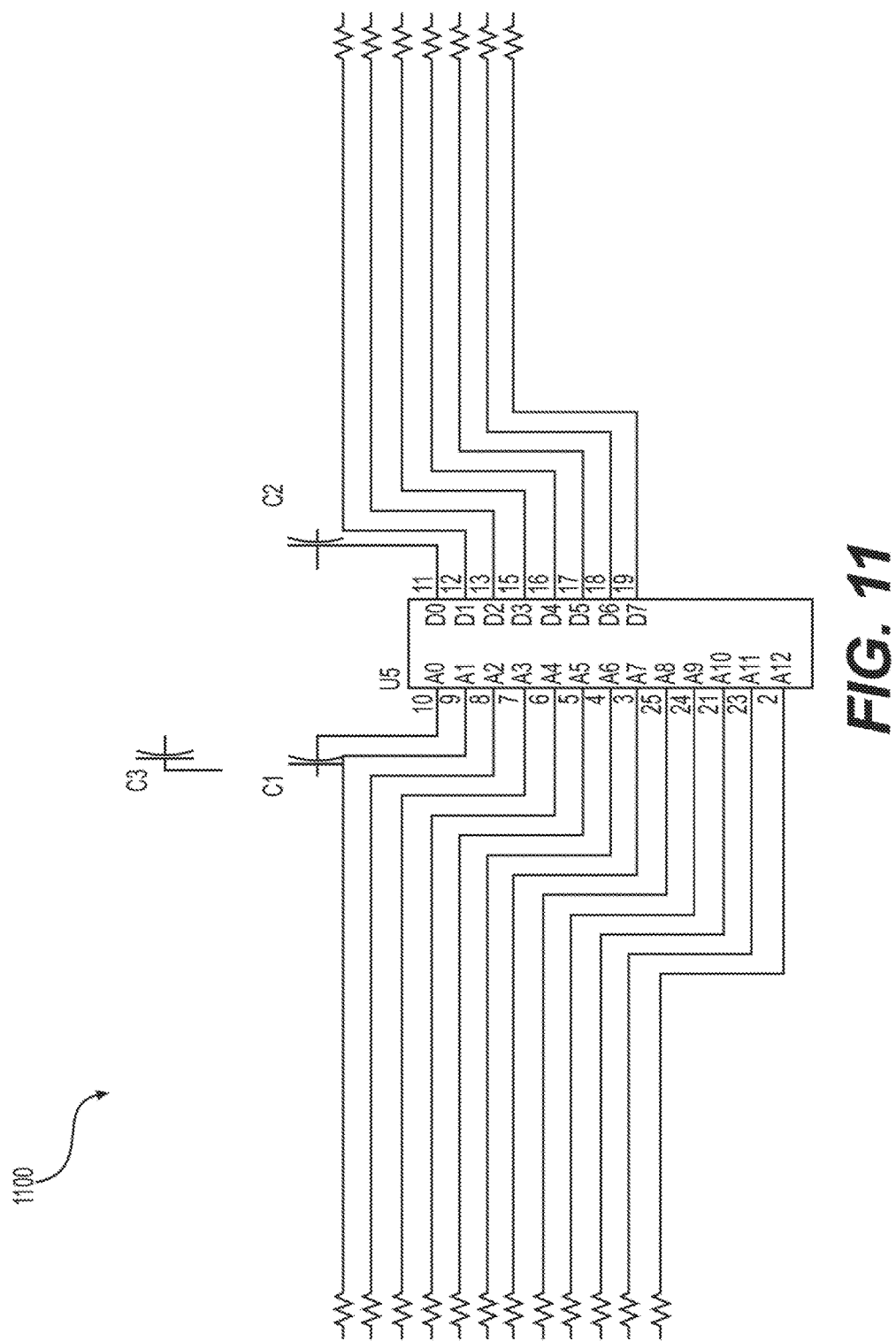
FIG. 11 is a diagram depicting aspects of the display process in accordance with an embodiment of the present disclosure.

Referring now to FIG. 9, a diagram 900 depicting the problems faced by a designer when there is a lack of finding a valid path at a desired position is provided. In this particular example, a connectivity circuit instance, when component U5 is moved in a downward direction is shown. As is shown in FIG. 10, if the designer wants to place the part at a desired position as shown, there is no valid path calculated by the configured auto-router. However, there may exist some other valid paths at the above position, one of them is shown in FIG. 11 as an example, which may be calculated using another routing strategy or constraints. Using existing systems, schematic designers do not have any option to check if there exists a valid path for the given circuit instance.

Figure 12:
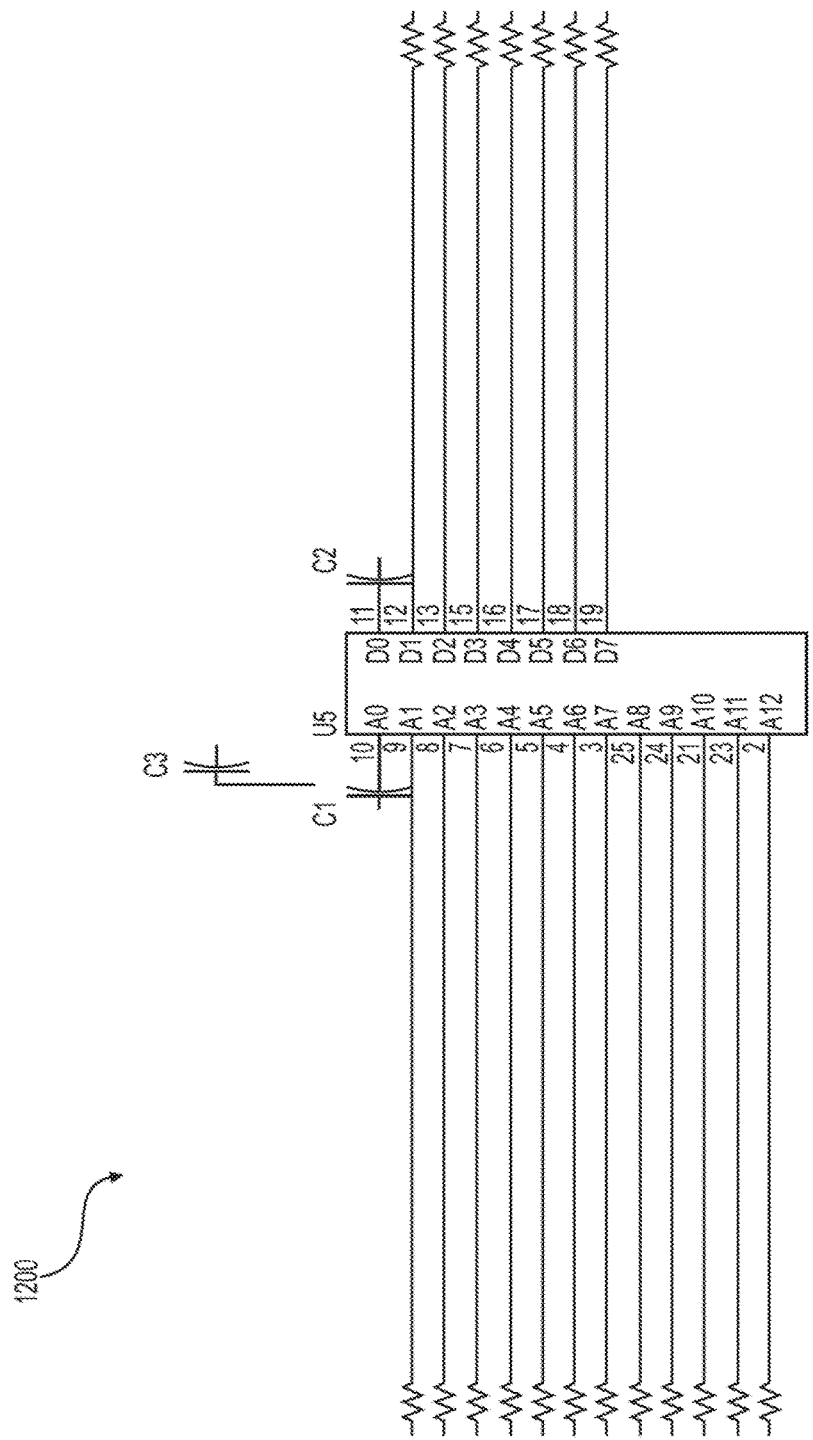
FIG. 12 is a diagram depicting aspects of the display process in accordance with an embodiment of the present disclosure.
Figure 13:
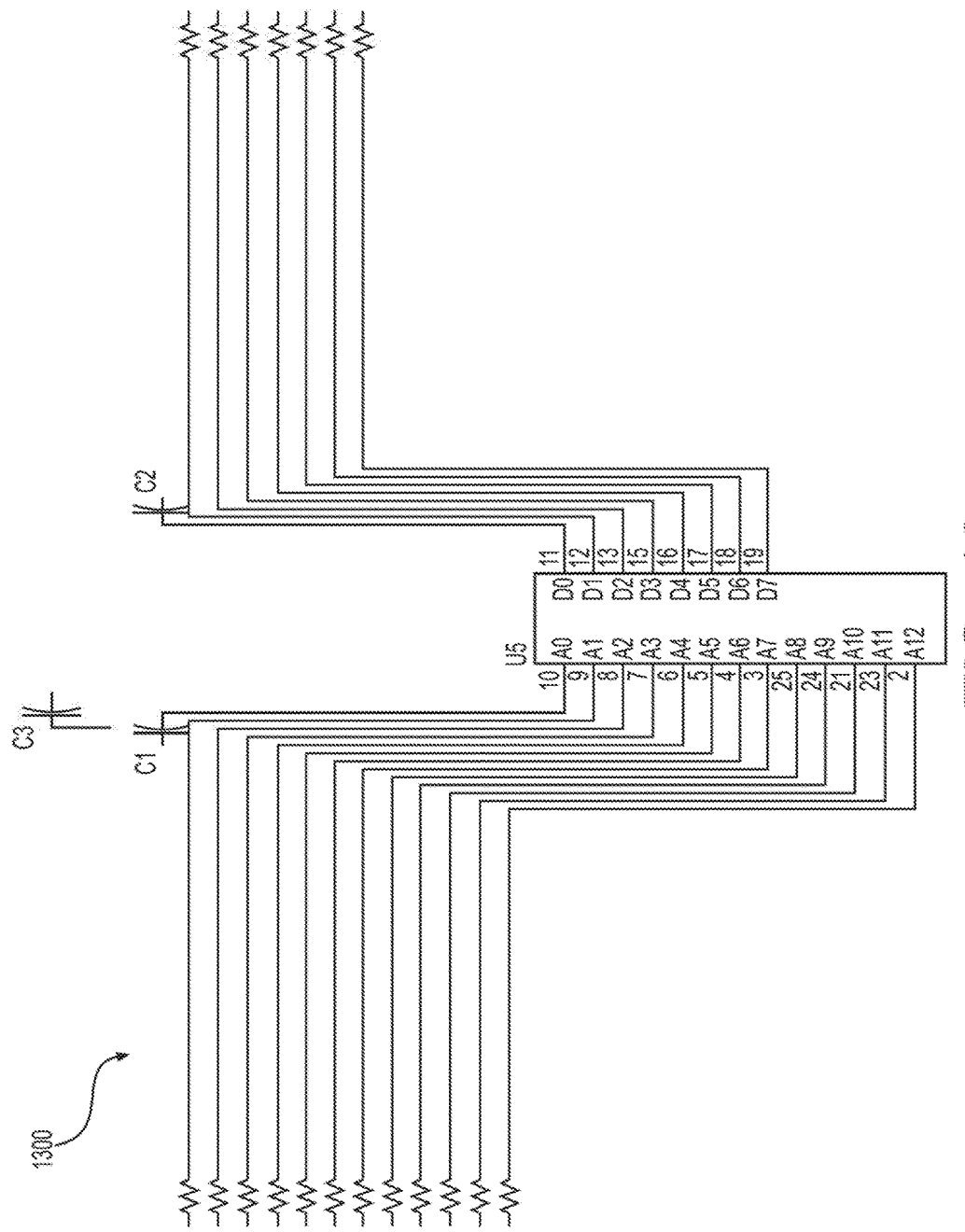
FIG. 13 is a diagram depicting aspects of the display process in accordance with an embodiment of the present disclosure.
Figure 14:
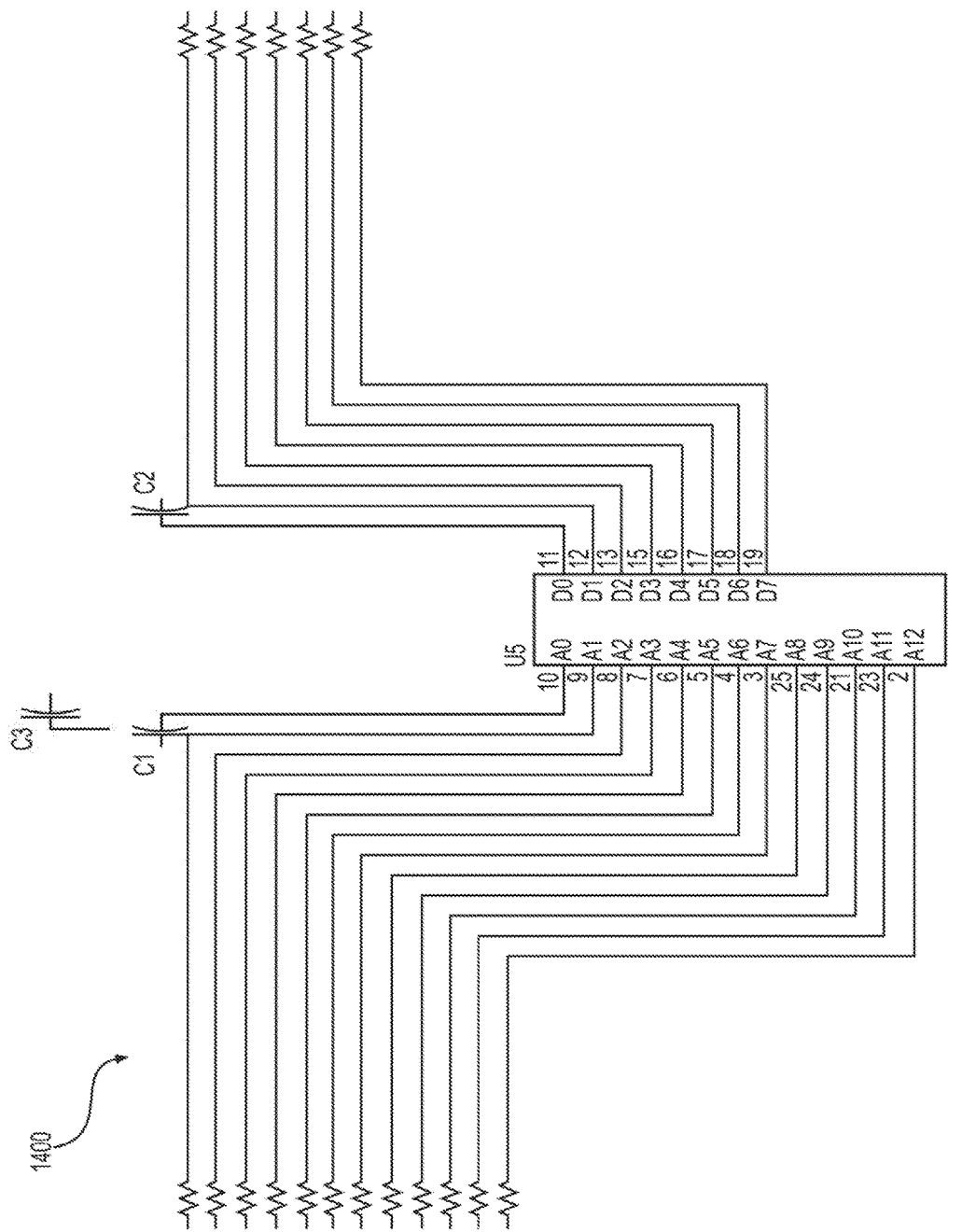
FIG. 14 is a diagram depicting aspects of the display process in accordance with an embodiment of the present disclosure.
Figure 15:
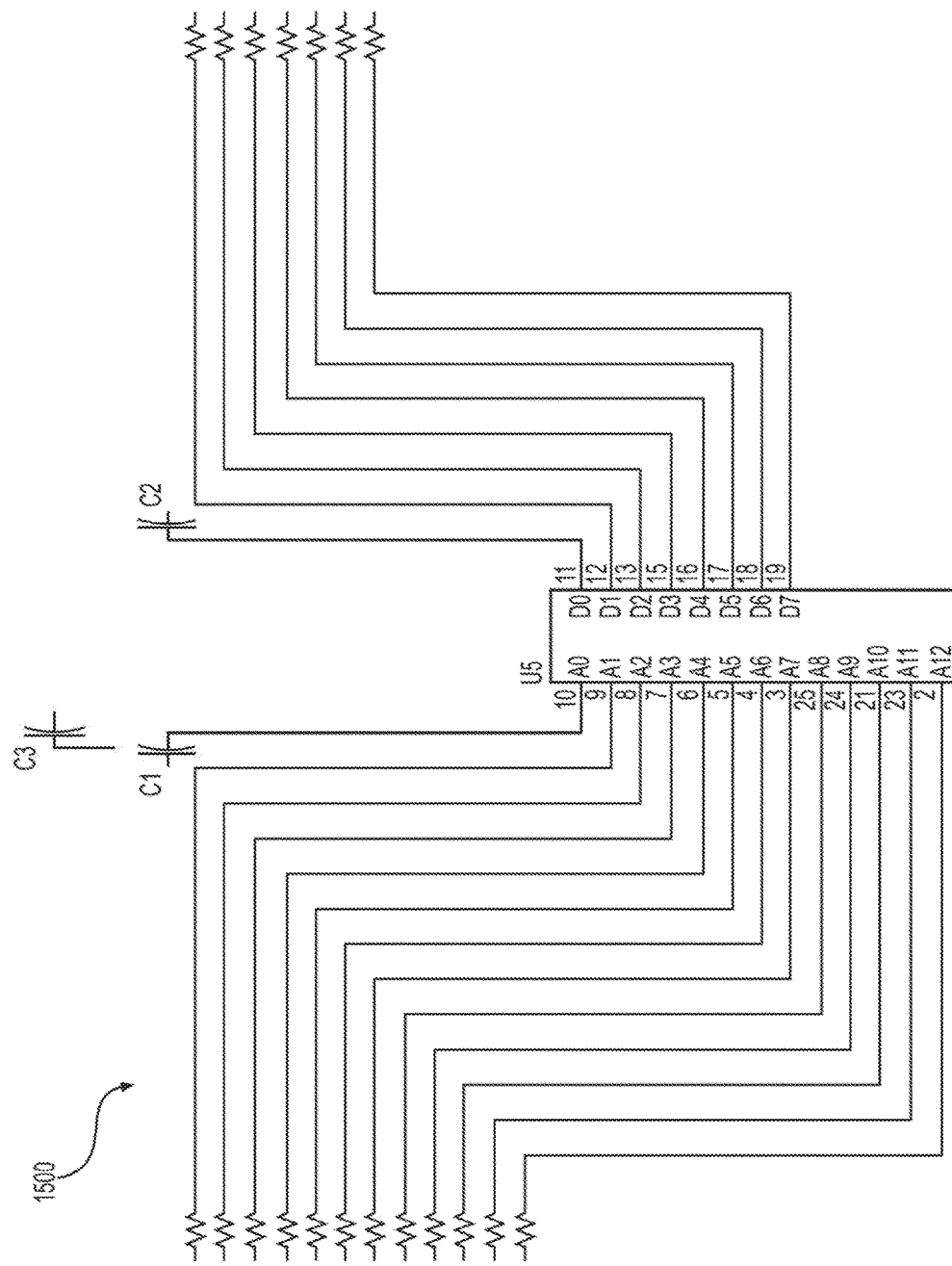
FIG. 15 is a diagram depicting aspects of the display process in accordance with an embodiment of the present disclosure.

Referring now to FIG. 12, a diagram 1200 depicting the problems faced by a designer when there is a lack of different configurations for same routing strategy is provided. In this particular example, a connectivity circuit instance for the component U5 on the schematic is shown. When U5 is moved downwards, there exists different route paths depending on the minimum stub length is set. FIGS. 13-15 display different route path for minimum stub lengths of 1, 2 and 3, respectively. Existing systems do not provide any method to set such configuration for a routing strategy for simultaneous evaluation.

In contrast, display process 10 described herein may be configured to provide the designer with an option to perform controlled and interactive selection of routing path among the possible paths during the routing process based on the pre-defined routing strategies chosen by him/her. During static or dynamic auto-routing processes (e.g., component movement) multiple possible routing paths depending on configured routing strategies may be calculated and visually displayed to the designer in an interactive manner. Accordingly, the designer may have an option to interactively select the routing path which he/she thinks is the best for his/her requirements and thus controls the whole auto-routing process to a great extent. Upon the designer's selection of the best-suited route paths, the selection may be honored and committed.

Embodiments of display process 10 may be configured to display multiple possible route sets to the designer by deploying the auto-router with different constraints or auto-router with different strategies altogether. Additionally and/or alternatively, display process 10 may provide real-time feedback to the designer for every calculated route path sets, from which the designer may choose the best-fit route as per the design aesthetics requirements.

In some embodiments, display process 10 may be configured to provide a mechanism to display multiple possible route paths to give the important information to the designer about the possibility of having more than one route path set for the same circuit instance. Additionally and/or alternatively, display process 10 may allow the designer to configure multiple auto-routing strategies to generate alternate set of route paths for the same circuit instance.

In some embodiments, display process 10 may be configured to provide an interactive view with easy navigation with multiple possible route paths to allow the designer to interactively select the best-fit route path as per design aesthetics. Embodiments of display process 10 may be configured to provide real-time comparative feedback to the designer to assist them in making a decision. In a dynamic auto-routing example, this real-time calculation and feedback may allow the designer to make an informed decision even for the placement of a moving component at the best-suited location.

Embodiments of display process 10 may be configured to provide a mechanism so that even if one auto-router strategy fails to find any valid route set for a circuit instance, other configured routing strategies or constraints may still determine valid route path sets and those valid route path sets allow the designer to make his best decision. Embodiments of display process 10 may be configured to provide a mechanism to the designer to generate multiple route path sets using the same strategy with same constraints and/or different constraints. It should be noted that some or all of the features discussed herein may be applicable both for static as well as dynamic cases of auto-routing.

Referring now to FIG. 16, an example graphical user interface depicting an example of a configuration settings options associated with a pre-configured routing strategy is provided. Accordingly, the designer may select one or more auto-route strategy configurations along with their specified constraints from the pre-configured list to be used during static or dynamic auto-routing to find the new route path. Based on the selected routing strategy configuration list, multiple routing paths may be calculated during dynamic auto-routing (e.g., component movement) or static auto-routing. The multiple routing paths may be displayed to the user using any suitable approach. For example, in some embodiments, an in-place display may be used. In this display method, there may be a keyboard shortcut key or any other input device association to display the multiple route paths set possibilities to the designer one-by-one shown at the actual circuit instance place. For example, in one particular embodiment, pressing the "Next" arrow key or "N" key, alternate route path sets are displayed to the designer. The designer may select any of the alternatives and then the selection may be honored and committed.

Additionally and/or alternatively, display process 10 may provide a preview of all routing path simultaneously in a preview display window. In this display method, the designer may be presented with a preview window to display multiple route paths sets simultaneously in the context of circuit instance. An easy navigation method using keyboard shortcut key or any other input device association may be provided to allow the designer to make his/her selection.

Figure 17:
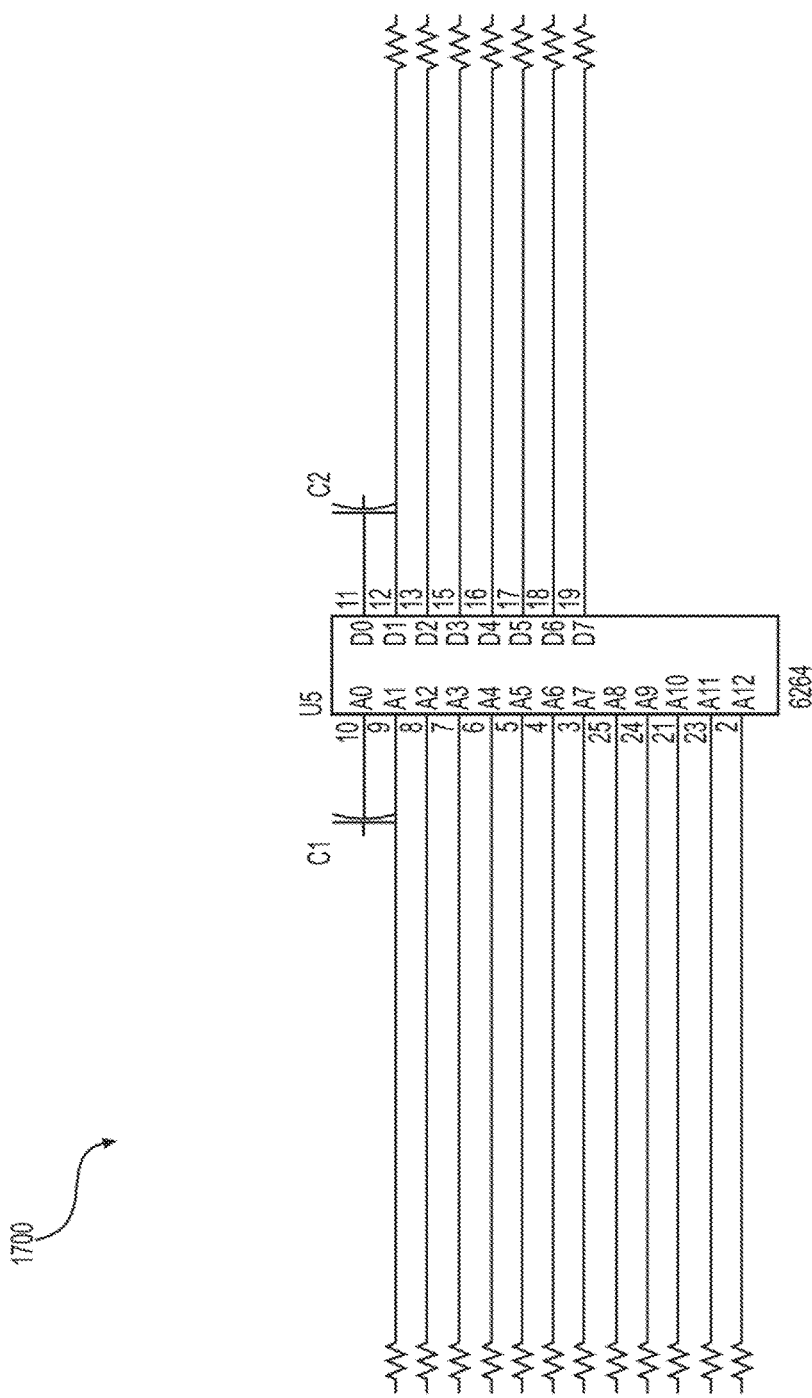
FIG. 17 is a diagram depicting aspects of the display process in accordance with an embodiment of the present disclosure.
Figure 18:
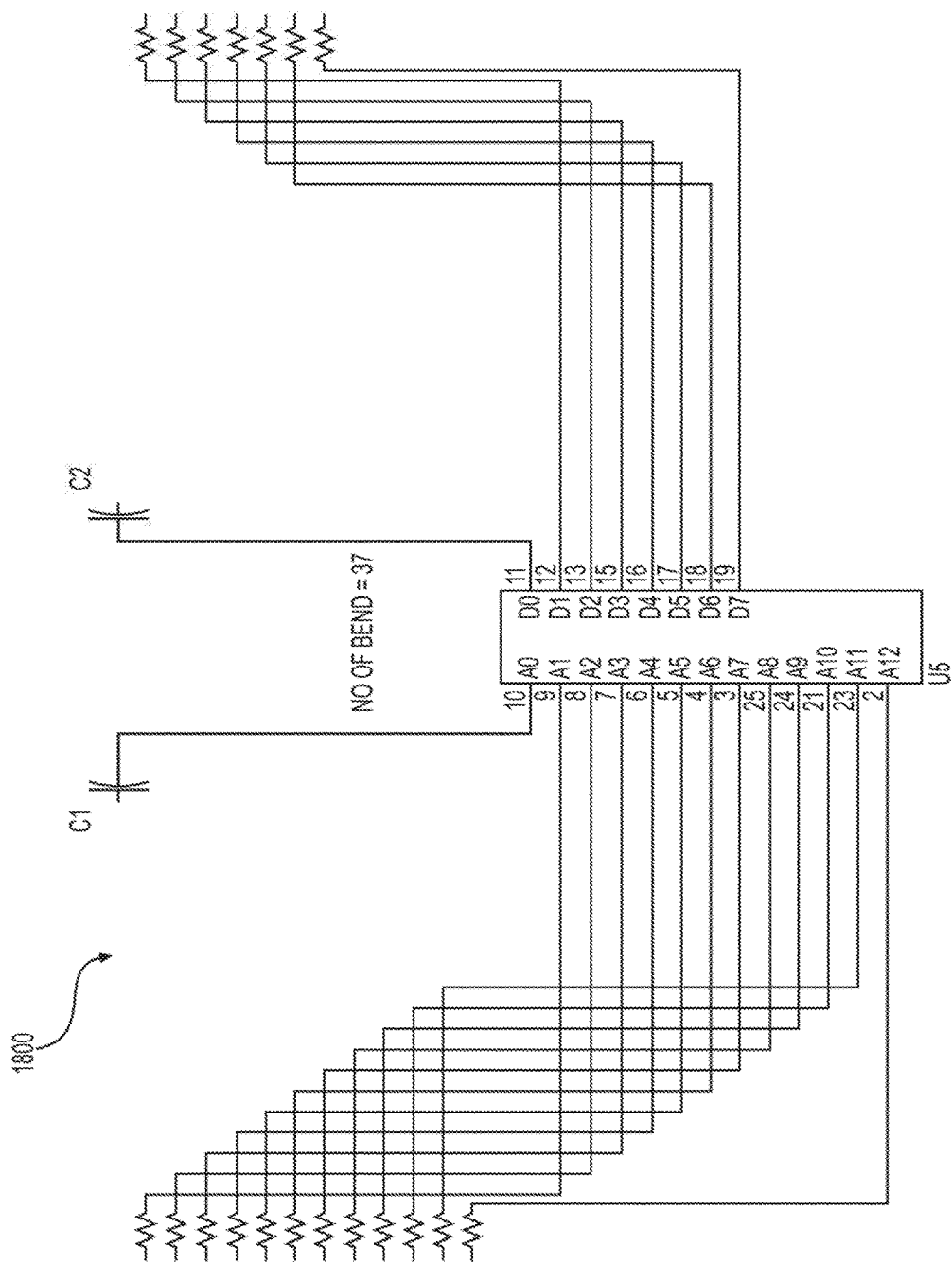
FIG. 18 is a diagram depicting aspects of the display process in accordance with an embodiment of the present disclosure.

Referring now to FIG. 17, an example depicting an in-place display is provided. In this example, when the component U5 is being moved to a new location, e.g., shifted downwards, on the schematic canvas, there may be multiple set of routes possible between the moved component's pins with their respective connections, the system shows one of the possible route paths to the designer first (see FIG. 18).

Figure 19:
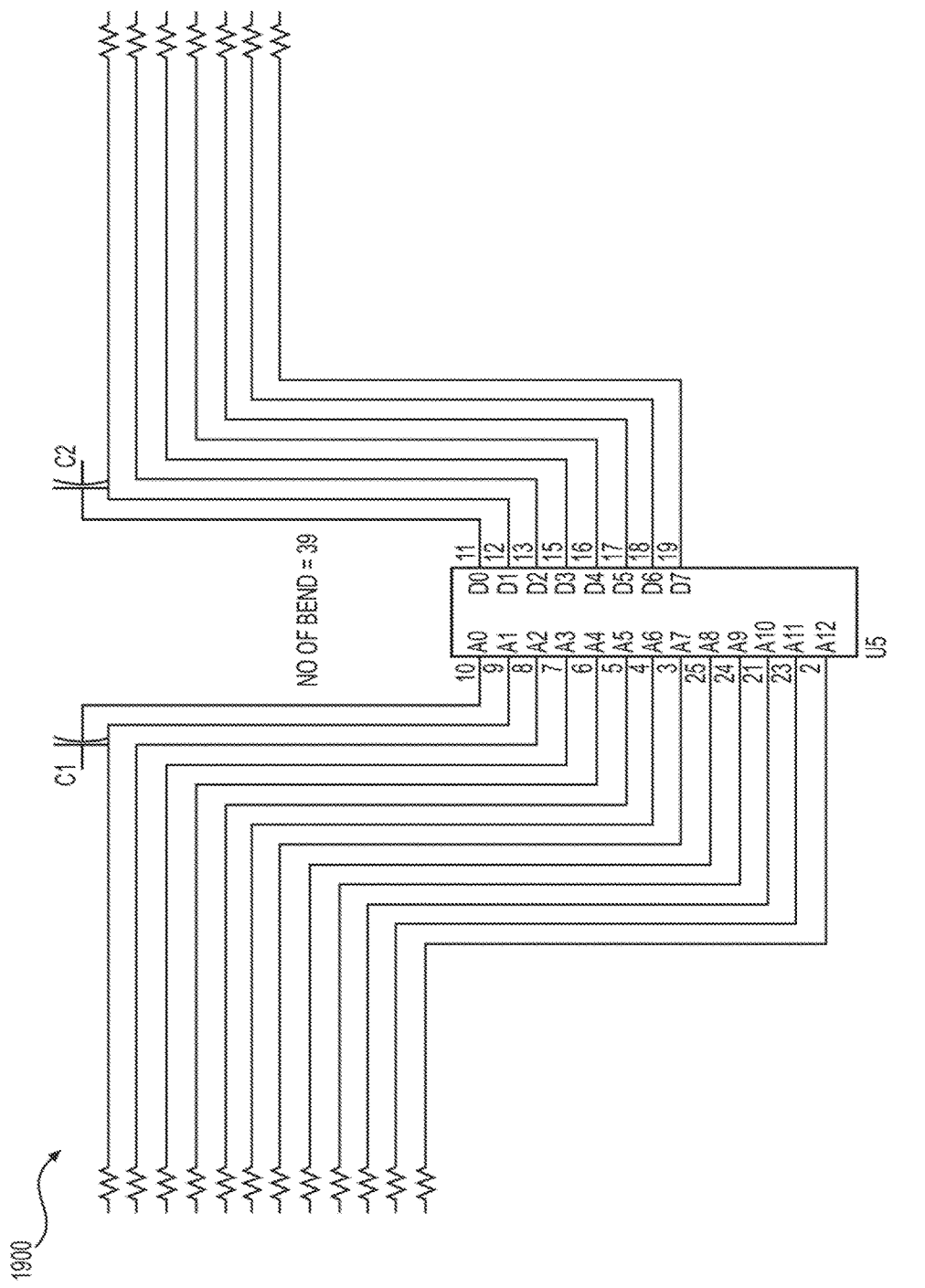
FIG. 19 is a diagram depicting aspects of the display process in accordance with an embodiment of the present disclosure.

Then, and as shown in FIG. 19, upon receiving an input (e.g., through keyboard shortcut key, e.g., "Next" arrow key or some other input device association), alternate route paths may be displayed to the designer one-by-one with real time route characteristics, such as number of bends. The designer may then select one of the route path sets based on design aesthetics and route characteristics; the selected route path set may be committed to the design.

Figure 20:
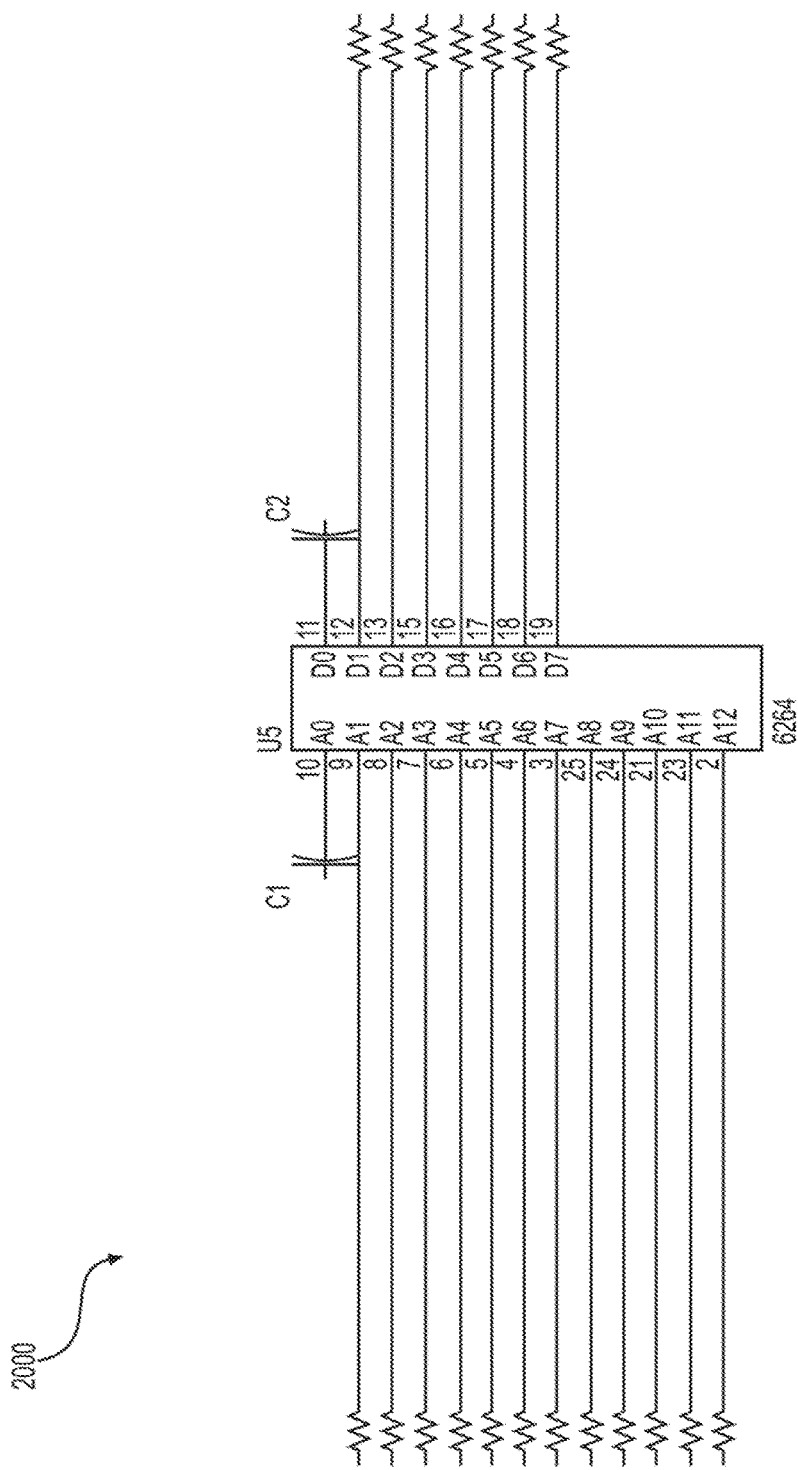
FIG. 20 is a diagram depicting aspects of the display process in accordance with an embodiment of the present disclosure.
Figure 21A:
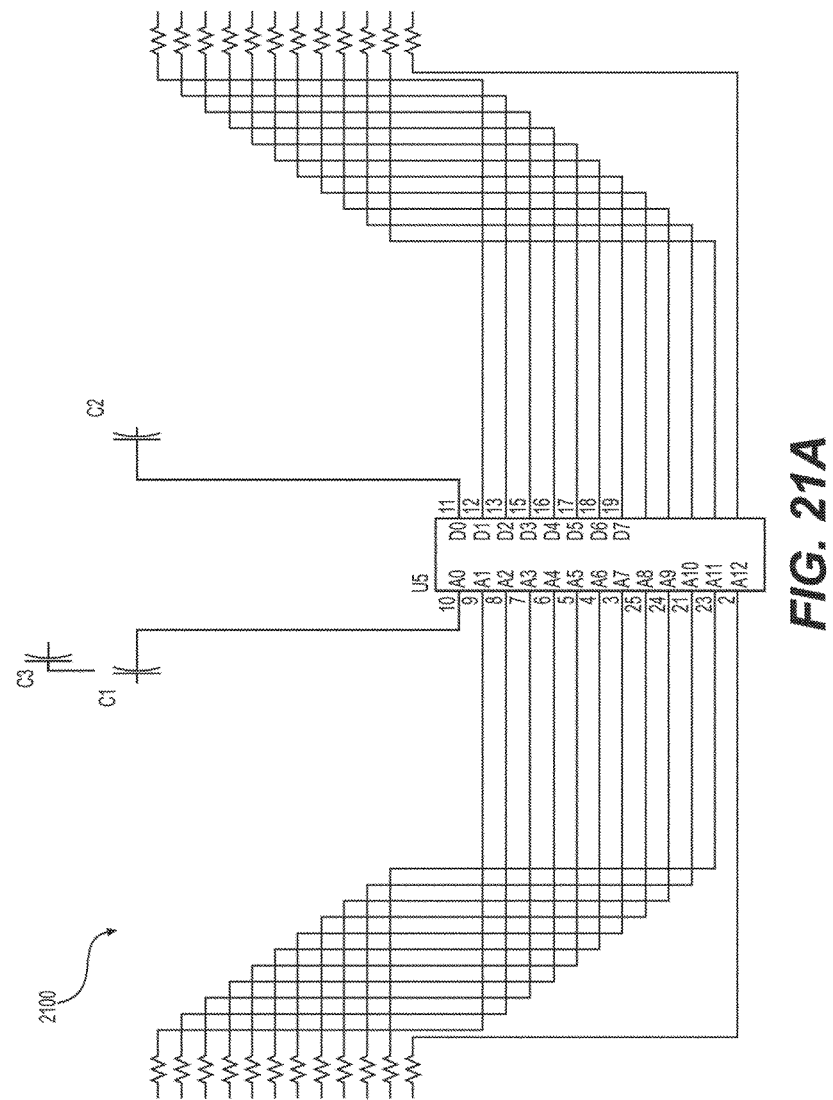
FIGS. 21A-E are diagrams depicting aspects of the display process in accordance with an embodiment of the present disclosure.
Figure 21B:
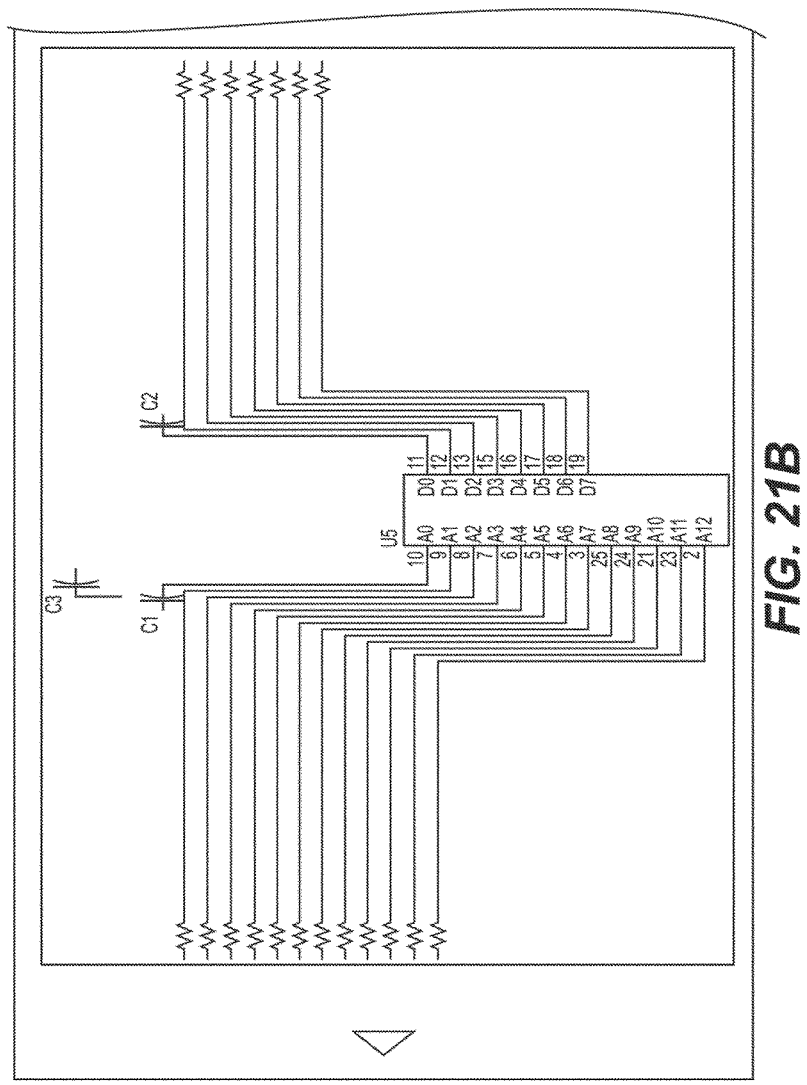
Figure 21C:
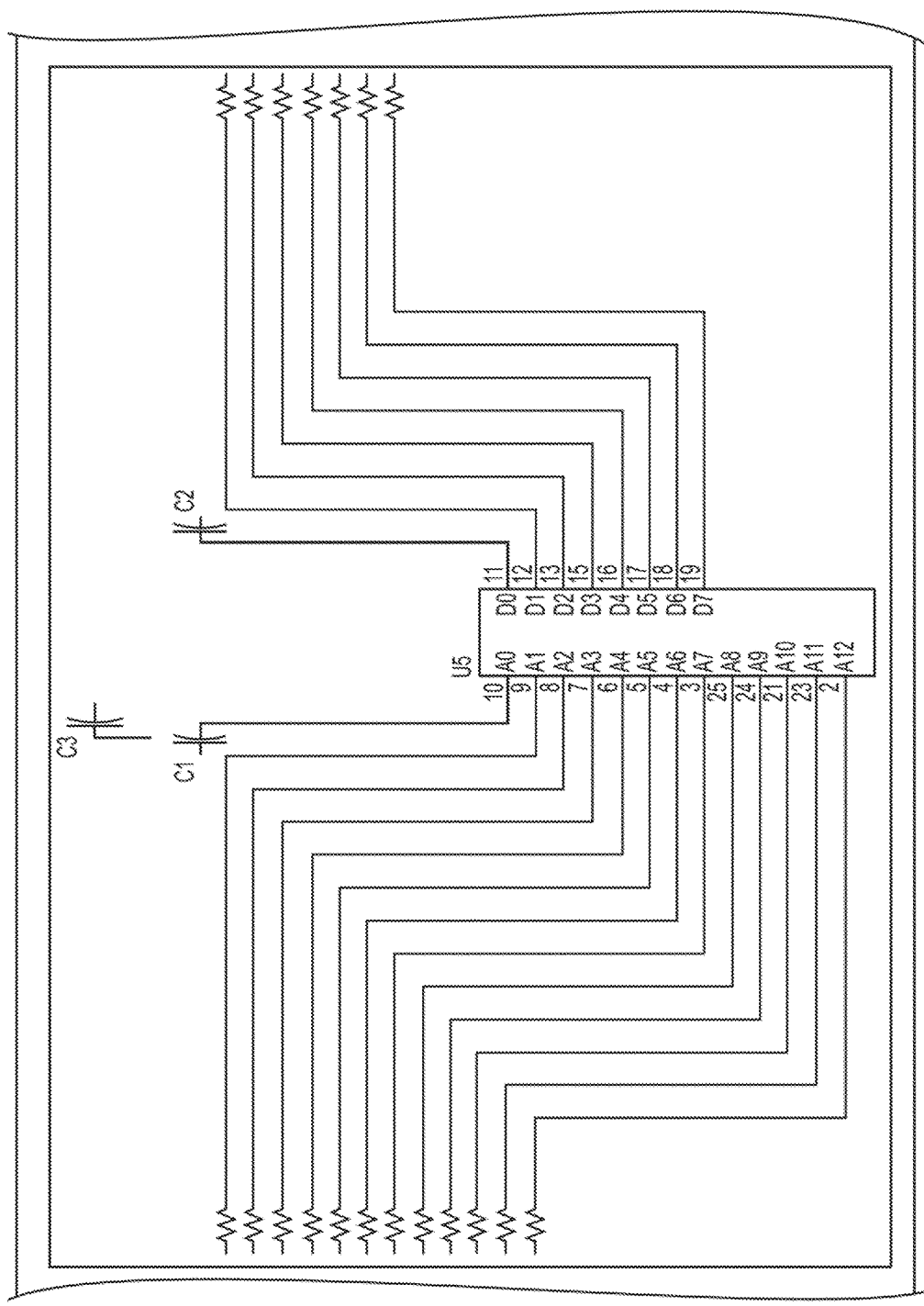
Figure 21D:
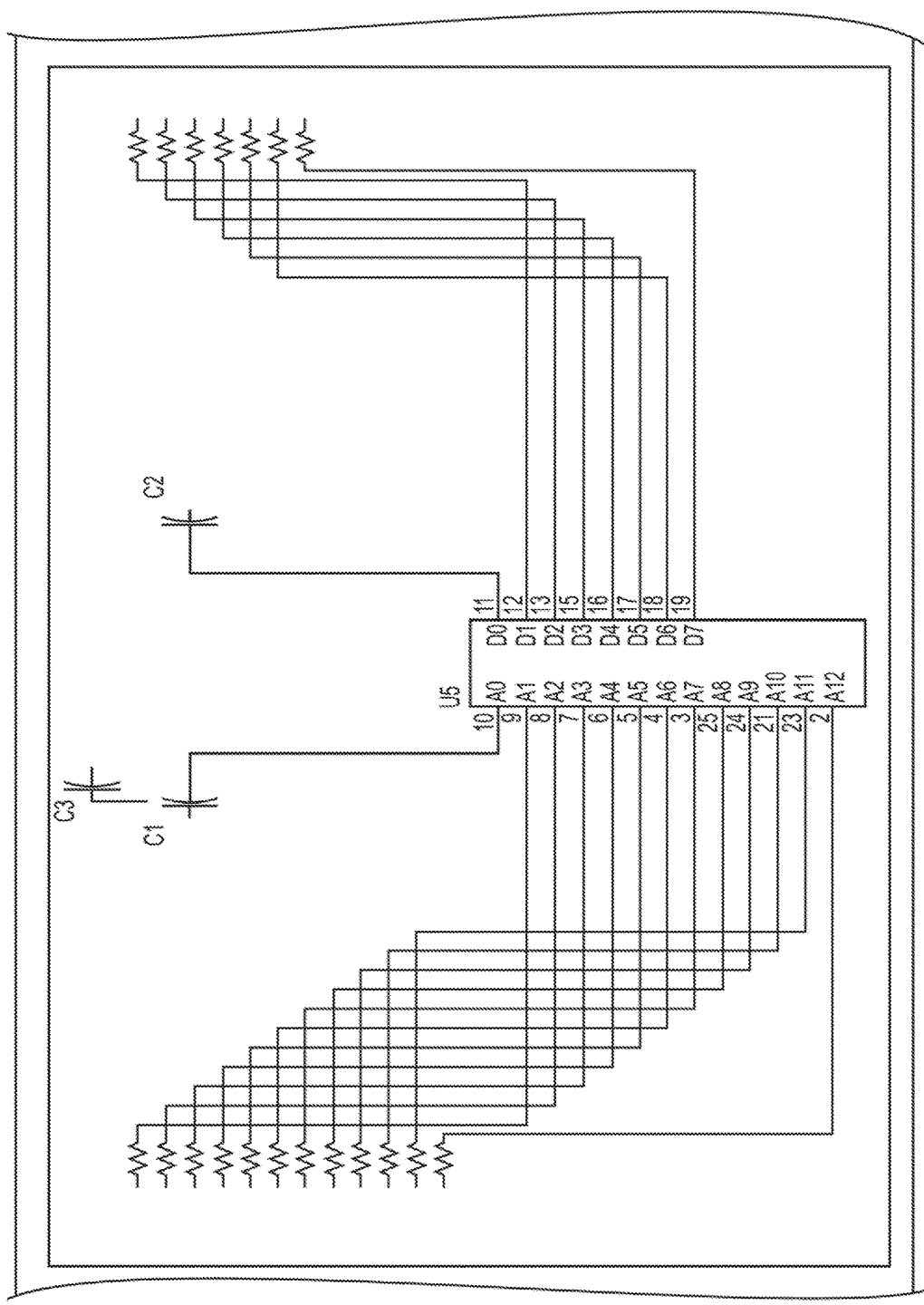
Figure 21E:
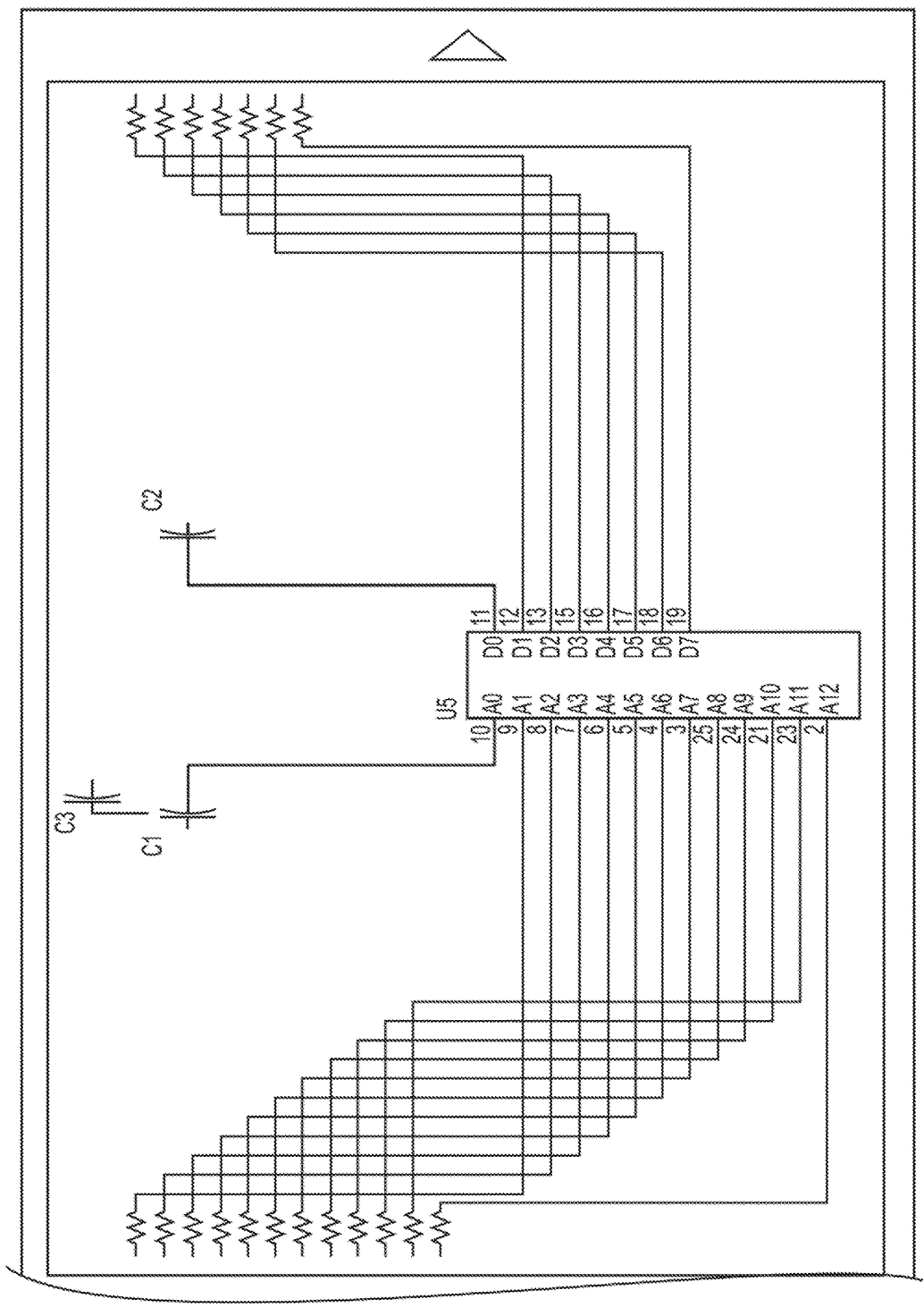

Referring now to FIG. 20, an embodiment depicting a preview of all routing paths simultaneously in a preview display window is provided. In this example, when the component U5 is being moved to a new location, shifted downwards, on the schematic canvas, there may be multiple sets of routes possible between the moved component's pins with their respective connections. Accordingly, the system may show one of the possible route paths to the designer first in-place, but at the same time, it may show in a preview window with easy navigation to the designer multiple route possibilities with real-time calculation of route characteristics in the context of circuit instance, as shown in FIGS. 21A-E. In this way, the designer may select the best-fit as necessary and the selection may be honored and committed. On hovering on any alternative, a scaled view can also be presented (e.g. on any of the four options shown on FIGS. 21A-E).

Figure 22:
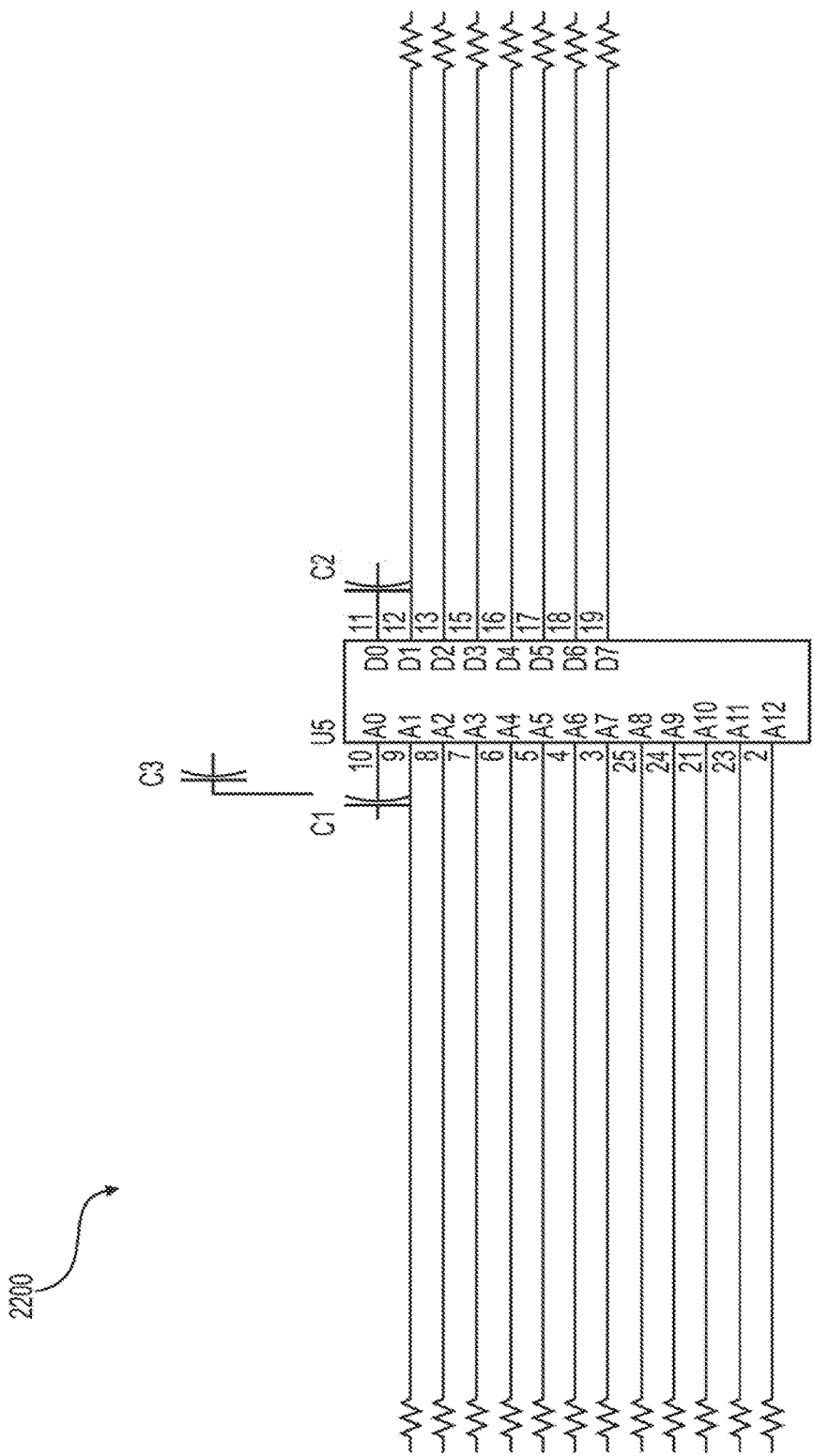
FIG. 22 is a diagram depicting aspects of the display process in accordance with an embodiment of the present disclosure.
Figure 23:
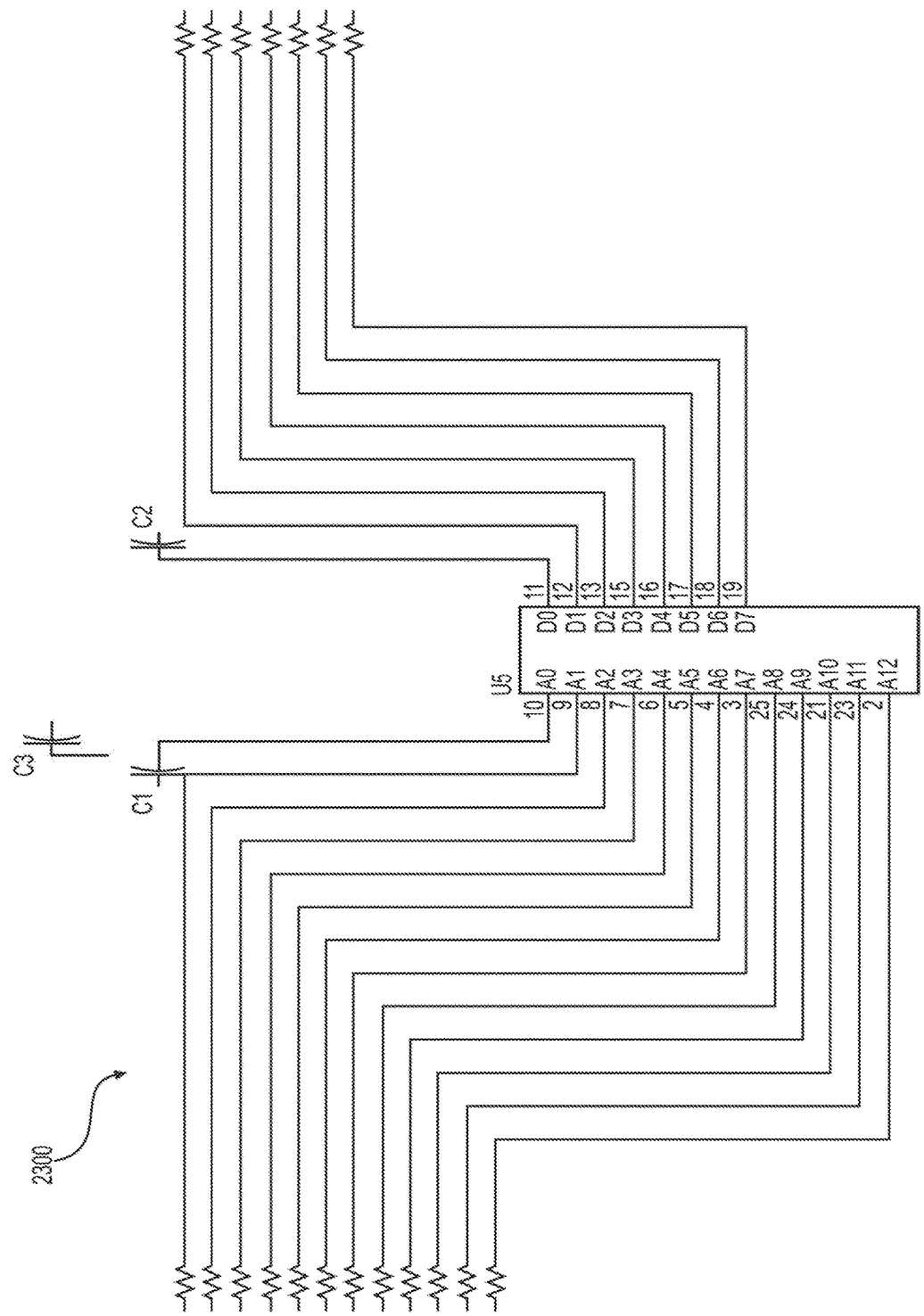
FIG. 23 is a diagram depicting aspects of the display process in accordance with an embodiment of the present disclosure.

Embodiments of display process 10 may allow for the setting of a configuration for the same route strategy. This is depicted in FIG. 22. The route paths may be displayed depending on the minimum stub length set to 2 (FIG. 23) and 3 (FIG. 24) respectively, in the routing strategy configuration.

In some embodiments, when the user selects components and moves them, the routing operation of display process 10 may initiate by creating a router grid of the same size as the page hot spot grid, with no hotspot marked on it. Then, the routing operation may be performed in a number of phases, which are described in further detail hereinbelow.

In some embodiments, Phase 1 may include the detection of objects and points. This may be a one-time operation and may be performed when the component move is initiated. Accordingly, display process 10 may group the selected components and its hot spot points and the components connected to it under one or more categories. Some of these categories may include, but are not limited to, dynamic objects (e.g., the objects selected for movement), static points (e.g., hotspot points which are not selected but are connected to the connectivity object which are moved), and dynamic points (e.g., hotspot points which are present on the components which are moved). After the objects are grouped, the router grid may be updated with the hot spots calculated while grouping the objects.

In some embodiments, Phase 2 may include a route path calculation. In this phase display process 10 may read the pre-configured routing configuration of selected routing strategies. Then, based on the strategies, the route paths may be calculated. This phase may be executed for each component movement.

In some embodiments, Phase 3 may include the rendering of the route path. In this phase display process 10 may draw the wire based on the route path calculated in phase 2. This phase may be executed for each component movement.

In some embodiments, Phase 4 may include a commitment to a route path. In this phase the wire objects created in Phase 3 may be added to the page objects. This phase may be executed at the end when user has finalized the route path by providing an input from a keyboard or mouse down.

In some embodiments, for an in place view of the routing path, the schematic designer may provide an input from a keyboard (or other input device), to display the alternative route option, and display process 10 may switch the routing strategies and the routing strategies configuration and performs the Phase 2 and Phase 3 operation stated above for each of the routing strategy or constraints. Some embodiments may use a z-router with different constraints as different strategies.

In some embodiments, for a preview of all the routing strategies, display process 10 may perform Phase 1, Phase 2 and Phase 3 operations stated above and render it into thumbnail view, from which the user can select one of the option. The rendering of the dynamic objects may be performed in another layer for easy management of clearing the previous objects which are moved and rendering the component and the wires based on the calculated new route path, at the new position.

Embodiments of display process 10 may provide numerous advantages over existing systems. For example, display process 10 may be configured to bridge the gap between the designer and the tool's automated behavior. As discussed above, the tool's automated behavior often may not meet the designer's need accurately. Embodiments of display process 10 may provide the designer with multiple route choices with all desired and comparative real-time feedback, which saves his/her time in creating and/or updating his/her circuits. Further, display process 10 improves the chances of meeting the design needs in terms of design aesthetics (e.g., route characteristic becomes very high due to multiple choices presented with interactive selection at these important routing stages). Embodiments of display process 10 may minimize any manual routing effort, which may in turn, minimize the manual errors as well. The designer has control over what routing strategies and constraints need to be running and thus he/she has more control over the overall routing process. Real-time feedback on the route path may be displayed that may assist the user in deciding which routing path is optimal.

In some embodiments, EDA application 20 and/or display process 10 may support a variety of languages and/or standards. EDA application 20 may support one or more software extensions, which may provide a high-throughput channel between the testbench and the device under test (DUT), and enable automated metric driven verification of embedded software exactly as if it were another part of the DUT. EDA application 20 and/or display process 10 may be used in conjunction with one or more EDA tools such as those available from the Assignee of the subject application.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method in an electronic design comprising:
   providing, using one or more processors; an electronic design;
   visually displaying a plurality of possible route sets associated with the electronic design at a graphical user interface, wherein each of the plurality of possible route sets are displayed as an electrical path at the graphical user interface, wherein visually displaying is associated with at least one of static auto-routing and dynamic auto-routing;
   providing an option to select between the plurality of possible route sets at the graphical user interface;
   generating real-time feedback for each of the plurality of possible route sets at the graphical user interface; and
   providing an option to configure a plurality of auto-routing strategies to generate at least one alternate set of route paths for a circuit instance.

2. The computer-implemented method of claim 1, wherein the plurality of possible route sets are based upon, at least one of, a same set of constraints and one or more different sets of constraints.

3. The computer-implemented method of claim 1, further comprising:
   determining if a particular routing strategy will fail.

4. The computer-implemented method of claim 3, further comprising:
   if it is determined that the particular routing strategy will fail, providing one or more alternative routing strategies.

5. A non-transitory computer-readable storage medium having stored thereon instructions that when executed by a machine result in the following operations:
   providing, using one or more processors, an electronic design;
   visually displaying a plurality of possible route sets associated with the electronic design at a graphical user interface, wherein each of the plurality of possible route sets are displayed as an electrical path at the graphical user interface, wherein visually displaying is associated with at least one of static auto-routing, and dynamic auto-routing;
   providing an option to select between the plurality of possible route sets at the graphical user interface;
   generating real-time feedback for each of the plurality of possible route sets at the graphical user interface; and
   providing an option to configure a plurality of auto-routing strategies to generate at least one alternate set of route paths for a circuit instance.

6. The computer-readable storage medium of claim 5, wherein the plurality of possible route sets are based upon, at least one of, a same set of constraints and one or more different sets of constraints.

7. The computer-readable storage medium of claim 5, wherein operations further comprise:
   determining if a particular routing strategy will fail.

8. The computer-readable storage medium of claim 7, wherein operations further comprise:
   if it is determined that the particular routing strategy will fail, providing one or more alternative routing strategies.

9. A system comprising:
   one or more processors configured to provide an electronic design and visually display a plurality of possible route sets associated with the electronic design at a graphical user interface, wherein visually displaying is associated with at least one of static auto-routing and dynamic auto-routing, wherein each of the plurality of possible route sets are displayed as an electrical path at the graphical user interface, the one or more processors further configured to provide an option to select between the plurality of possible route sets at the graphical user interface, wherein the one or more processors are further configured to generate real-time feedback for each of the plurality of possible route sets at the graphical user interface and to provide an option to configure a plurality of auto-routing strategies to generate at least one alternate set of route paths for a circuit instance.

10. The system of claim 9, wherein the plurality of possible route sets are based upon, at least one of, a same set of constraints and one or more different sets of constraints.

11. The system of claim 9, wherein the one or more processors are further configured to determine if a particular routing strategy will fail.

* * * * *